United States Patent [19]
Manor

[11] Patent Number: 6,164,384
[45] Date of Patent: Dec. 26, 2000

[54] METHOD FOR PRODUCING A PLURALITY OF CULTIVATED SPOTS FOR PLANTING OF TREES AND A ROLLING SPOT CULTIVATOR

[76] Inventor: Gedalyahu Manor, 15 Adam Hacohen Street, Haifa 32714, Israel

[21] Appl. No.: 09/412,709

[22] Filed: Oct. 5, 1999

Related U.S. Application Data

[60] Provisional application No. 60/104,778, Oct. 19, 1998.

[51] Int. Cl.[7] ................................. E02F 5/04; E21B 3/02
[52] U.S. Cl. ................................ 172/1; 172/48; 172/60; 172/108; 172/123; 172/125; 37/189; 37/195; 111/113
[58] Field of Search ...................... 172/108, 123, 172/60, 51, 52, 125, 103, 48, 1; 299/10, 39.9, 39.4, 39.1; 37/195, 189; 111/900, 113

[56] References Cited

U.S. PATENT DOCUMENTS

| | | | |
|---|---|---|---|
| 2,658,436 | 11/1953 | Gatti | 172/108 X |
| 3,261,117 | 7/1966 | Shoemaker et al. | 172/108 X |
| 3,750,758 | 8/1973 | Bancel | 172/108 X |
| 4,162,102 | 7/1979 | Rooymans | 172/108 X |
| 4,732,227 | 3/1988 | Wolf et al. | 175/170 |

FOREIGN PATENT DOCUMENTS

| | | |
|---|---|---|
| 9203206 | 8/1992 | Brazil . |
| 100138 | 11/1996 | Israel . |

*Primary Examiner*—Christopher J. Novosad
*Attorney, Agent, or Firm*—Frishauf, Holtz, Goodman, Langer & Chick, P.C.

[57] ABSTRACT

A method and apparatus for producing a plurality of spaced apart cultivated spots in soil. A spot cultivator (1) is moved across the soil in a direction in which the spaced apart cultivated spots are to be formed. The spot cultivator (1) includes at least one tilling shaft (7) which is mounted to roll about a horizontal axis which moves with the spot cultivator (1) and which is rotatable about a longitudinal axis of at least one tilling shaft (7). At least one tilling shaft (7) is rolled about said horizontal axis in a plane which intersects the soil. The at least one tilling shaft (7) has a length sufficient to contact and penetrate the soil at a controlled spacing during each rotation about the horizontal axis.

25 Claims, 22 Drawing Sheets

METHOD FOR PRODUCING A PLURALITY OF CULTIVATED SPOTS FOR PLANTING OF TREES AND A ROLLING SPOT CULTIVATOR

This application claims the benefit of U.S. Provisional Application No. 60/104,778 filed Oct. 19, 1998.

BACKGROUND OF THE INVENTION

The invention relates to a method and equipment for producing a row of spaced relatively shallow cultivated spots. Each cultivated spot is produced sequentially by a rolling spot cultivator without stopping the forward rolling motion of the cultivator while each spot is being produced. The present invention thus provides a compact machine for producing a plurality of spaced cultivated spots in a cost effective manner. The prior art utilizes relatively large machines which produce plurality of cultivated spots, sequentially, without forward or backward motion of the machine during the production of each cultivated spot.

It is an object of the invention to provide a method and apparatus for producing a plurality of spaced apart cultivated spots with each spot being produced by a rolling spot cultivator which produces each spot without stopping the forward rolling motion of the cultivator.

SUMMARY OF THE INVENTION

The invention provides a method for producing a plurality of spaced apart, preferably in line, cultivated spots using a travelling rolling spot cultivator. The rolling spot cultivator has a rolling (rotating) transmission head which rotates about a horizontal axis which is substantially parallel to the ground and which moves forward in the direction of motion of the cultivator. The transmission head supports at least one tilling shaft having at least one tilling blade (element). The tilling shaft is of sufficient length to penetrate into the soil with each rotation of the transmission head about the horizontal axis. The tilling shaft rotates about the horizontal axis in a plane which intersects the soil; preferably in a plane substantially perpendicular to the soil. The tilling shaft also rotates about its longitudinal axis during contact with the soil thereby penetrating the soil and tilling the soil by action of at least one blade extending outwardly from the tilling shaft.

During a forward motion of the rolling spot cultivator, the tilling shaft enters the soil and tills the soil by action of at least one blade rotating about the longitudinal axis of the tilling shaft. The tilling action continues as the rotating tilling shaft changes its angle to the soil to a vertical position as the spot cultivator passes over the center of the spot which is being cultivated and then continues to change its angle to the soil to a backward angle as it moves out of the soil by the continuous rolling of the transmission head and tilling shaft about said horizontal axis. The rotation of said tilling shaft is stopped before said shaft and said at least one blade extending therefrom completely exits the soil to prevent throwing out soil. The rotation of said tilling shaft is resumed before it penetrates the soil at the next spot to be cultivated. The rolling of said tilling shaft about said horizontal axis after it exits from the soil is controlled so that said tilling shaft again contacts the soil to begin forming a second cultivated spot at a predetermined distance from the previous cultivated spot.

In another embodiment of the method and cultivator, two angularly spaced apart tilling shafts may project from a single transmission head thereby producing, sequentially, two cultivated spots during a single rotation of the transmission head about the horizontal axis. Similarly, three or more angularly spaced apart tilling shafts could project from a single transmission head.

The soil penetrating edge of the tilling shaft may have difficulty in penetrating the earth to commence the tilling action. Entry of the tilling shaft into the soil is facilitated by first penetrating the soil with a soil penetrating shank which also rotates about the same horizontal axis as the tilling shaft. The shank and the tilling shaft form an acute angle as they diverge in the direction away from the horizontal axis about which they rotate. The soil penetrating end of the shank rotates in the same plane that intersects the earth in which the tilling shaft also rotates or in a plane parallel thereto.

In another embodiment, a downwardly extending cultivator member is rigidly connected to the at least one tilling shaft and is spaced from said shaft and rotates therewith. This downwardly extending cultivator member is of a sufficient length so that when said tilling shaft reaches a maximum penetration of the soil, the downwardly extending cultivator member penetrates into the soil and forms a depression in the soil surrounding the cultivated spot and a mound in its center as it rotates with said tilling shaft.

DESCRIPTION OF THE PREFERRED EMBODIMENTS

Figure 1:
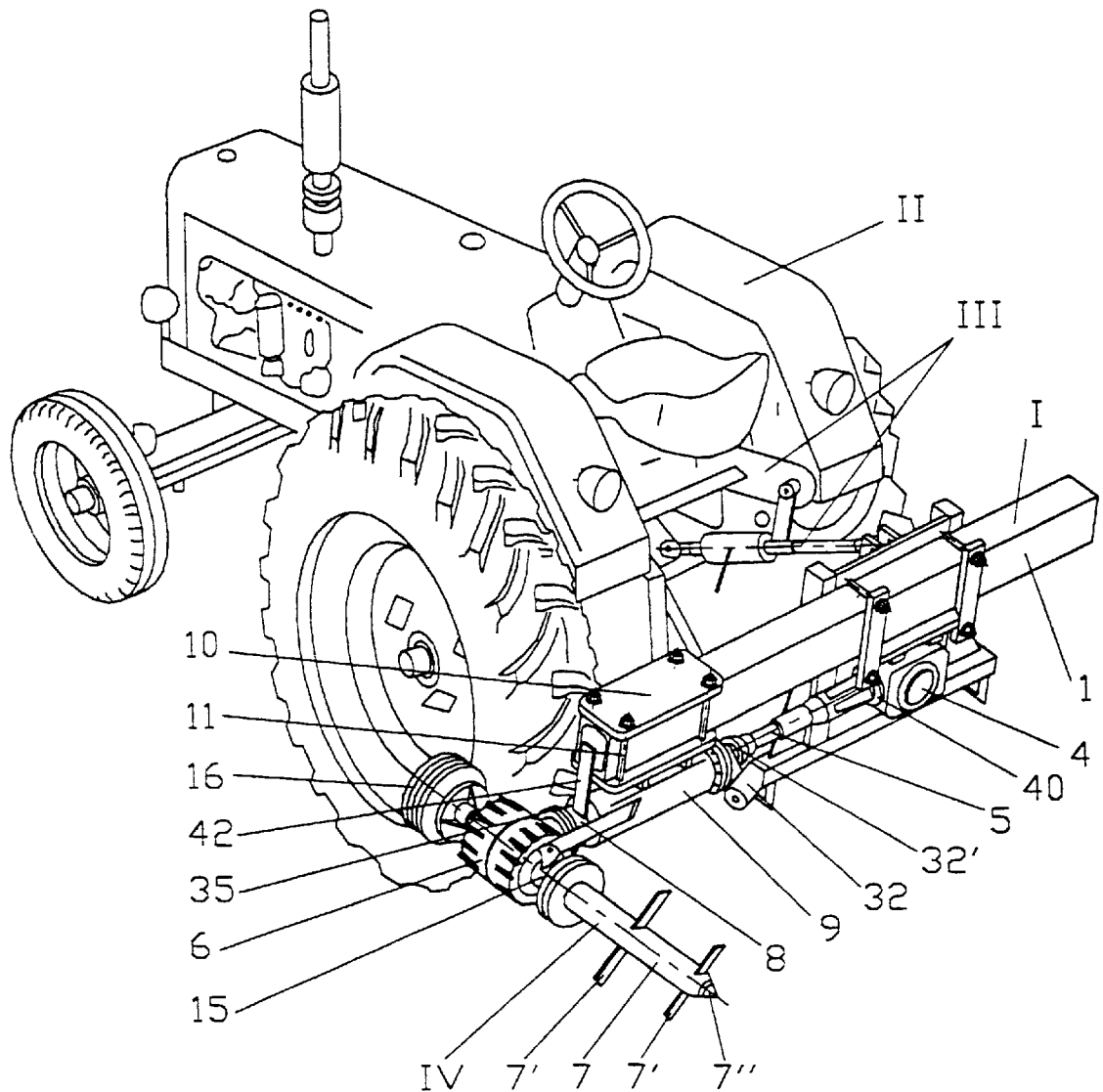
FIG. 1 is perspective view of a rolling spot cultivator attached to the rear of a tractor.

FIG. 1 illustrates a rolling spot cultivator I which is attached through a hitch system III to a tractor II. The rolling spot cultivator I supports a rotating horizontal shaft 5 positioned inside shaft 8 which is in housing 9. The horizontal shafts 5 and 8 are mounted on beam 1 by mounting plates 10 which are connected by bolts 11. Power is obtained from the tractor II through main power transmission gear 4 which is connected to rotating shaft 5 which transmit power via clutch 40 to the rolling transmission head 6 which has a protruding shaft 15 which is connected to the tilling shaft 7. The clutch 40 disengages the tilling shaft 7 in response to a signal from sensor 42 when the tilling shaft exits the soil thereby preventing throwing out tilled soil. The sensor 42 senses the angle of the horizontal shaft 8 which is directly connected to the rolling transmission head 6 and the tilling shaft 7. The predetermined angle is sensed in a preferred system by the sensor 42 being an electromagnetic sensor which gives a signal when a steel tooth approaches it. The sensed teeth (not illustrated) are mounted on shaft 8 to stop the rolling action or the tilling action at predetermined angles in relation to the tilling shaft 7 coming out of the soil and the shank 25 before entering the soil. The tilling shaft 7 is part of the revolving and rolling tilling system IV. Shaft 7 has four tilling blades 7' and a cone penetrating edge 7". The rolling transmission head 6 has a counterweight 16 axially mounted with the tilling shaft 7. The illustrated tractor II is a four-wheel tractor. Other self-propelled prime movers could be used in place of the four-wheel tractor such as a track vehicle or a combination wheel and track vehicle. The rolling action is powered by a hydraulic motor 32 and transmission 32' receiving hydraulic power from a pump in the tractor (vehicle).

Figure 2:
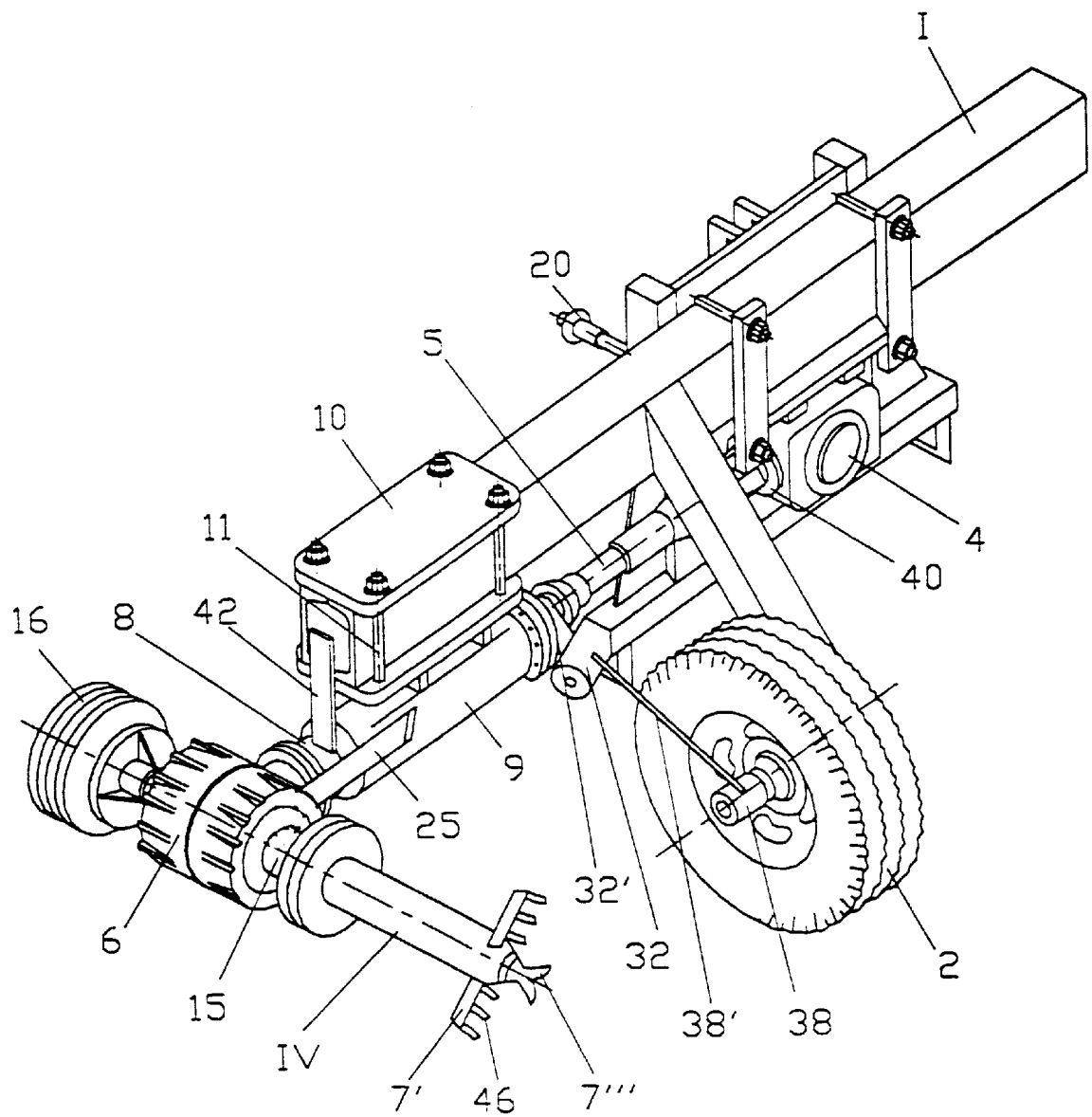
FIG. 2 is a perspective view of the rolling spot cultivator of FIG. 1 with an additional rolling wheel with a shank parallel to the tilling shaft.

FIG. 2 is an enlarged illustration of the rolling spot cultivator I of FIG. 1 with some modifications, particularly the addition of a rolling wheel 2 which support hydraulic pump 38 which is, sequentially, connected to the hydraulic motor 32 by connector 38' and the transmission for the hydraulic motor to power the rolling horizontal shaft 8 which transmits a rolling motion to the transmission head 6 perpendicular to the horizontal rolling shaft 8. The hydraulic motor 32 stops rolling the transmission head 6 after the tilling shaft exits the soil and before the shank enters the soil. In a preferred embodiment, the rolling of the transmission head is stopped immediately before the shank 25 enters the soil and the tilling shaft reaches the next spot to be cultivated by a signal from sensor 42 sensing a tooth mounted on shaft 8 and resumes the rolling motion in response to a signal from sensor 36 (see FIGS. 11 and 18) after reaching the desired spacing between the cultivated spots. Power for the rotary motion of the tilling shaft 7 is imparted from the tractor by shaft 20 to the main power transmission gear 4 through clutch 40 to the rotating shaft 5 to shaft 15 in the transmission head 6. Clutch 40 functions to disengage the rolling shaft 5 when the tilling shaft 7 exits the soil to stop rotation and prevent throwing out of tilled soil and reengage it to start rotation before reentering the soil. The sensor 42 is sensing the angular position of the tilling shaft 7 to disengage or engage the clutch 40. Sensor 42 preferably senses to stop the rotation of the tilling shaft 7 between its vertical position and the position when a periphery of the blade 7' exits from the soil. Sensor 42 also senses the angular position of the shank 25 to stop the shank from entering the soil, waiting for a signal from sensor 36 (FIG. 3) which measures the forward motion length of the vehicle. The tilling shaft 7 has two tilling blades 7' close to the edge and a fish tail penetrating edge 7'". The two tilling blades 7' have cutting teeth 46 mounted on (or formed as part of) the blades 7' for pulverizing hard soils. The shank 25 is attached to a flange rolling with transmission head 6 in a plane which is parallel to the tilling shaft 7.

Figure 3:
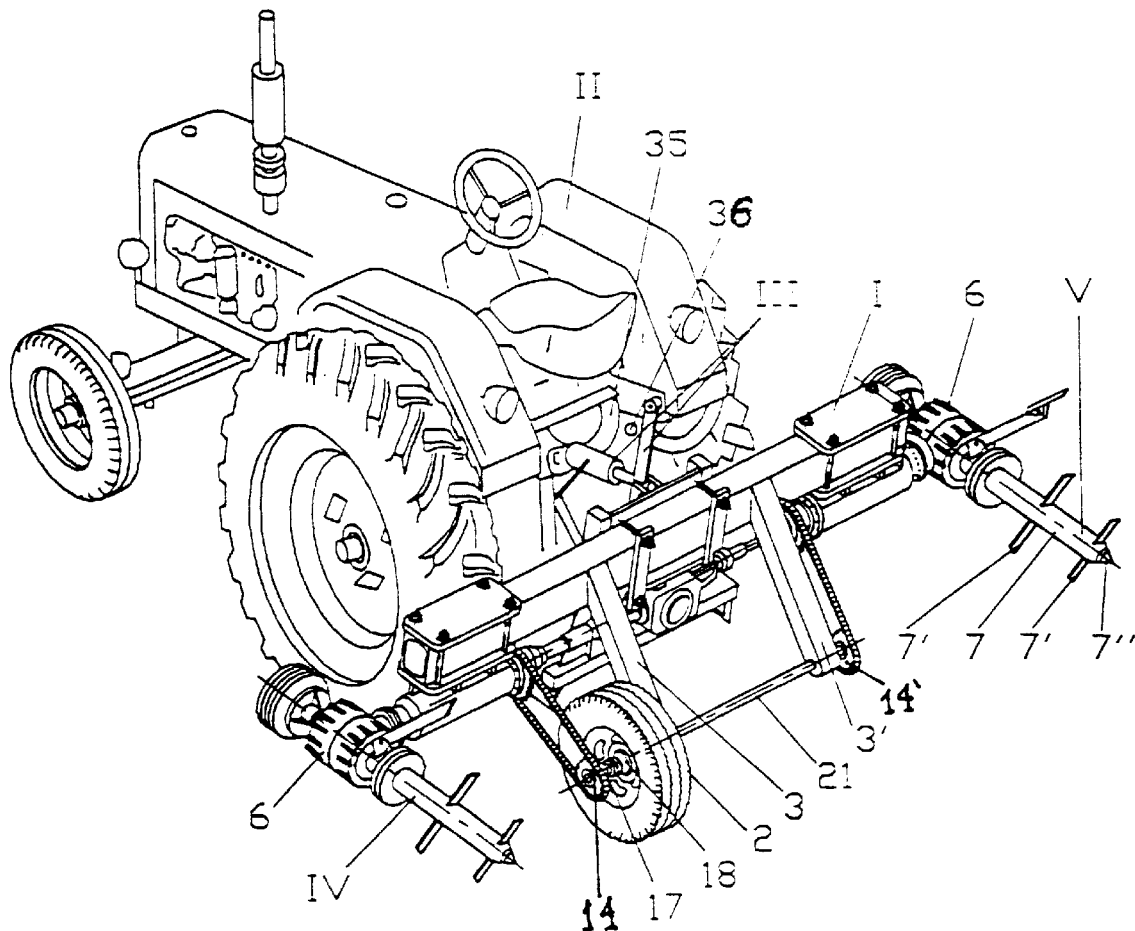
FIG. 3 is a perspective view of a rolling spot cultivator which can simultaneously spot cultivate two rows of spots attached to the rear of a tractor.
Figure 4:
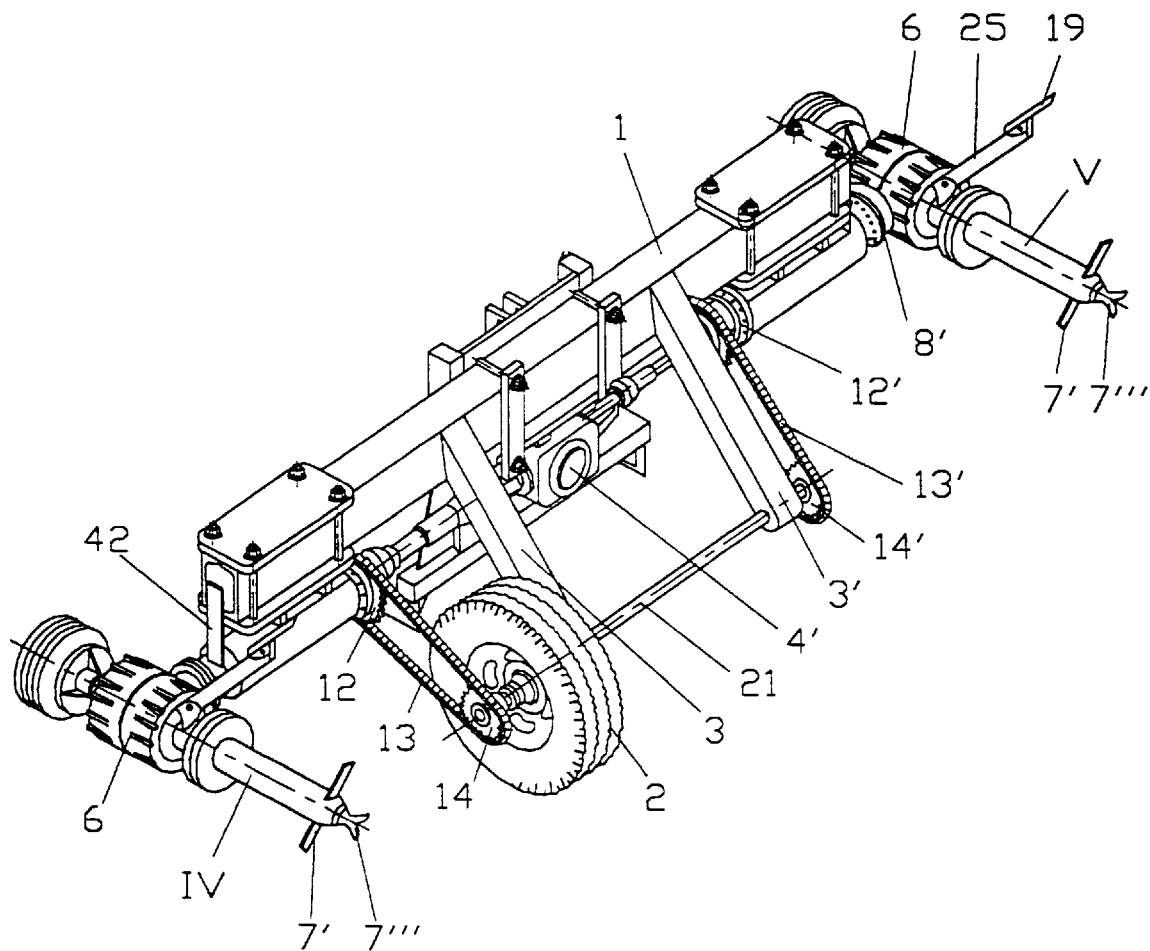
FIG. 4 is a perspective view of the rolling spot cultivator of FIG. 3, with hydraulic motor 4' instead of the main gear 4.

FIGS. 3 and 4 illustrate an embodiment wherein the rolling spot cultivator simultaneously cultivates two rows of spots. One row of spots is cultivated by the tilling system IV and the other row of spots is cultivated by the tilling system V which are mounted at opposite ends of the main beam 1. This embodiment also illustrates the use of the rolling wheel 2 to power the forward rotary motion of the transmission heads 6 through a transmission chain 13, 13' connecting sprockets 14, 14' and 12, 12' which rotate the horizontal rotary shafts 8, 8' which in turn provide forward rolling motion to the transmission heads 6. The rolling wheel structure and associated chain transmissions are supported by the wheel structure 3 and 3' with power being transmitted from the rolling wheel 2 to a sprocket 14' by shaft 21. In FIG. 3, sprockets 14, 14' are connected to the wheel 2 through clutch 17 and a brake 18. In FIG. 4, the tilling system V illustrates the shank 25 with the soil penetrative spearhead 19 at the end thereof. In FIG. 4, sensor 42 stops the rolling action before the shank enters the soil, by disengaging clutch 17 and operating brake 18 to stop the rolling action of the transmission head 6. In FIG. 3 sensor 36 provides a signal to engage the clutch 17 and release the brake 18 to resume the rolling action and start tilling a new spot after measuring the predetermined spacing on sprocket 35 which is rotating by the tractor wheel. Sprocket 35 has teeth at its periphery in spacings correlated to the forward motion of the vehicle equal to the desired spacing between the spots. The sensor 42 may stop the hydraulic motor 32 by valve 39 for the same purpose and sensor 36 may resume its rotation to till the next spot. In FIG. 4, there is a hydraulic motor 4' instead of the main transmission 4 (see FIG. 2). The hydraulic motor 4' stops the rotation and tilling action by valve 43 (see FIG. 19) with a signal from sensor 42 while coming out from the soil, and resume the rotation and tilling action before entering the soil at the next location.

Figure 5:
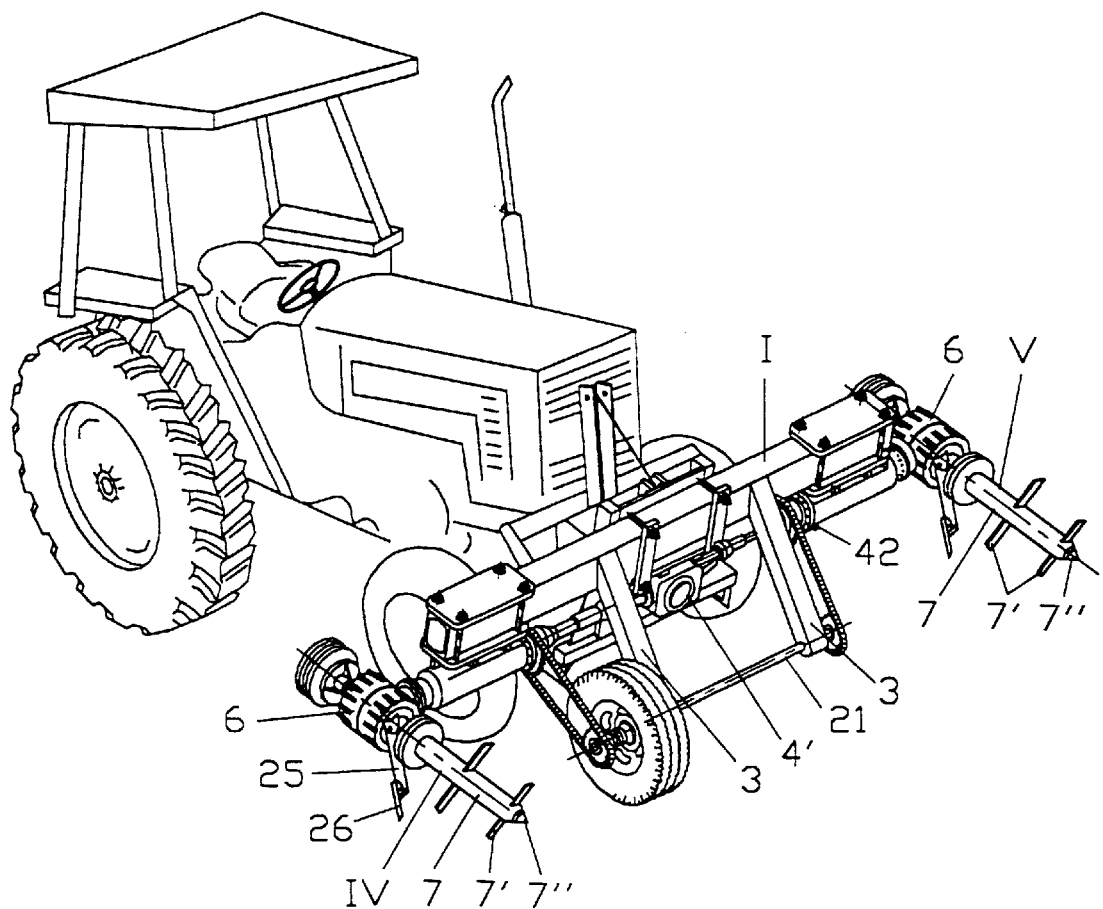
FIG. 5 is a perspective view of a rolling spot cultivator attached to the front of a tractor.

FIG. 5 illustrates an embodiment generally similar to that of FIG. 4 except that the main structure beam 1 is mounted at the front of the tractor and the tilling shaft has four blades 7' in two levels. Sensor 42 senses the angular position of the transmission head 6 to stop the rotation of the tilling shaft 7 to prevent throwing out of soil when coming out of the tilled spot. The control system stops the rotation of the tilling shaft 7 by disengaging clutch 40 or stopping hydraulic motor 4' and resume the rotation before entering the soil at the next location. Sensor 42 preferably senses to stop the rotation of the tilling shaft 7 between its vertical position and the position when the periphery of the blade 7' moves out of the soil.

Figure 6:
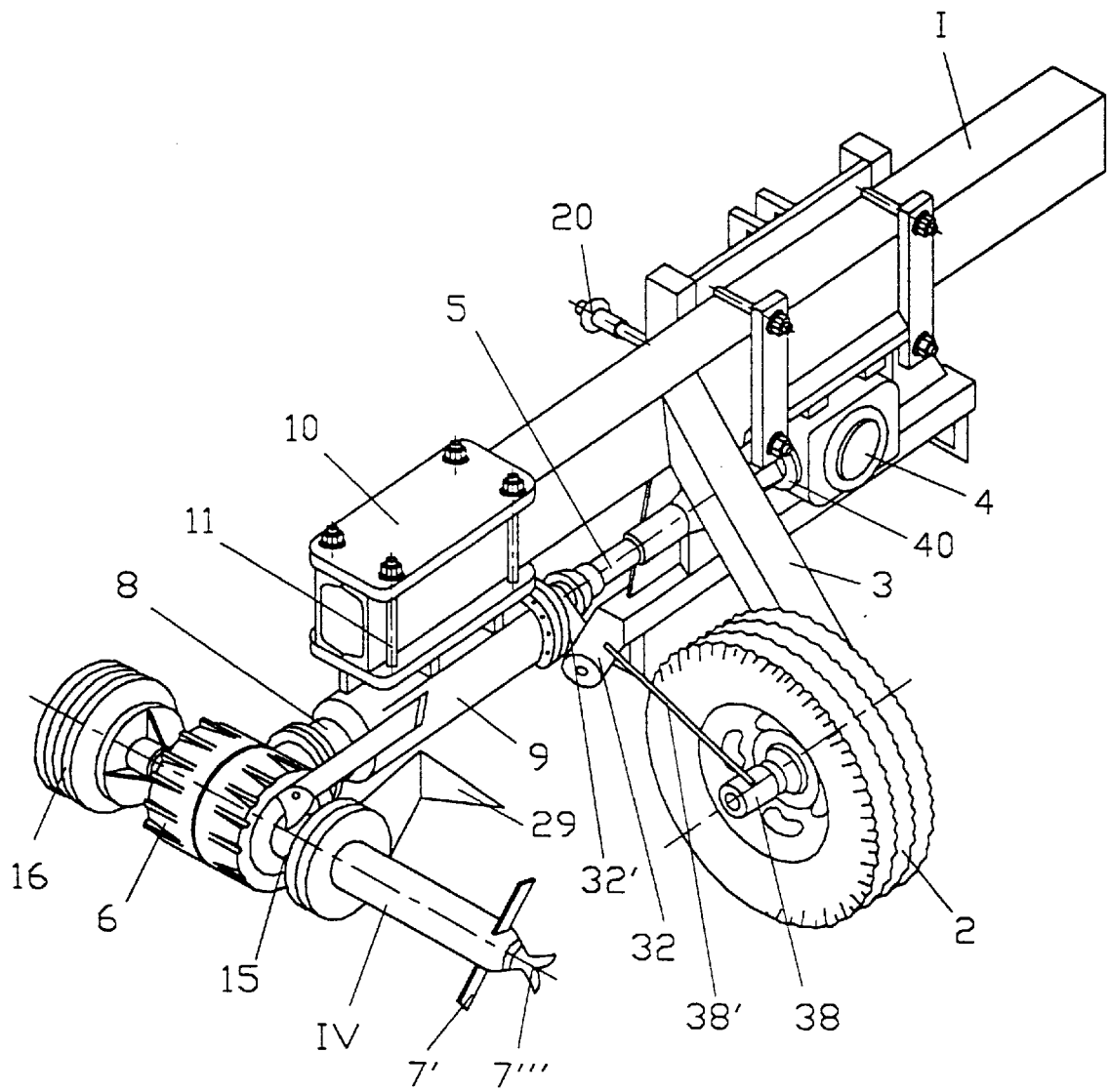
FIG. 6 is a perspective view of a rolling spot cultivator having a side mounted vertical cultivator.
Figure 7:
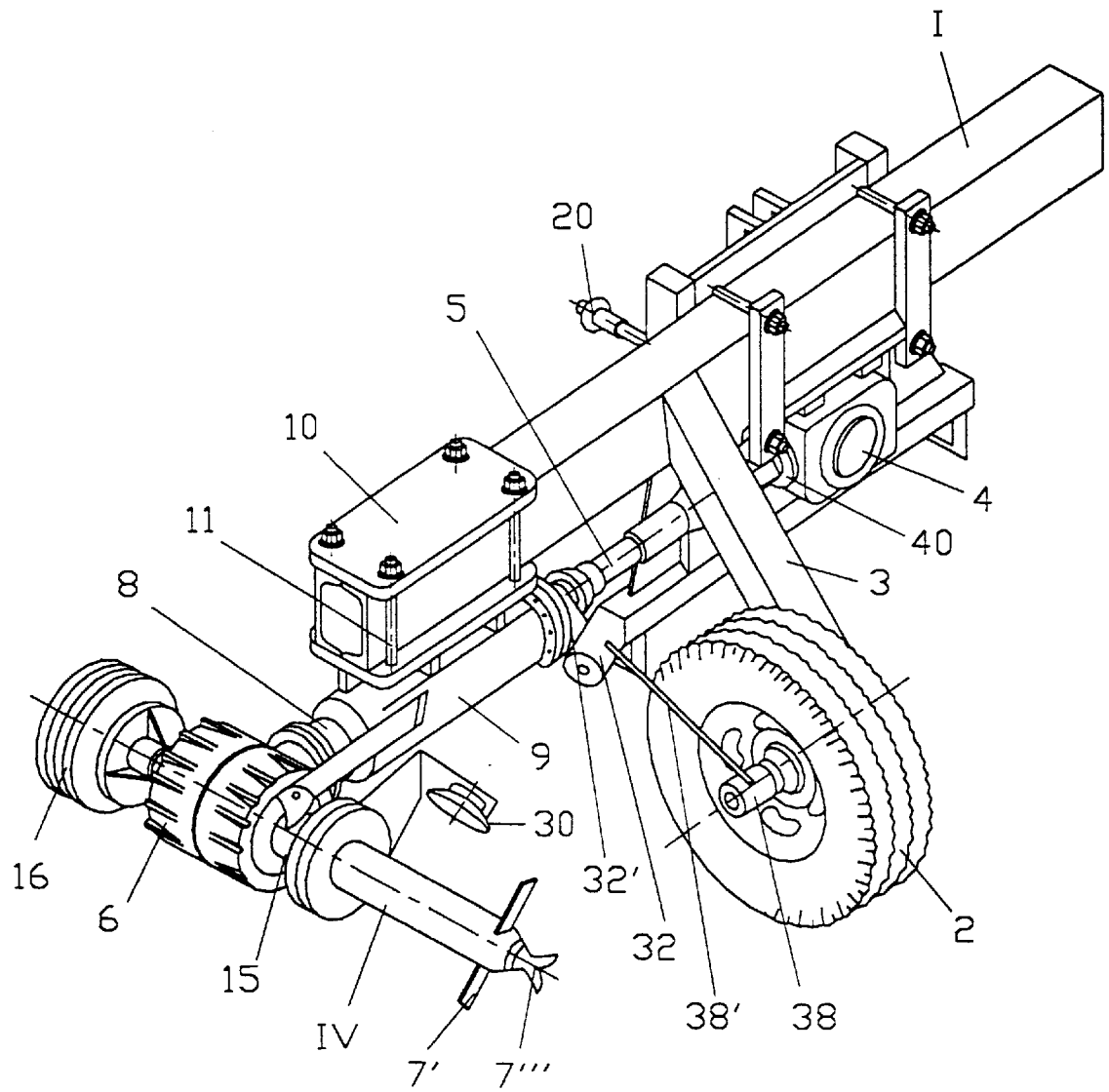
FIG. 7 is a perspective view of a rolling spot cultivator having a side mounted disk cultivator.
Figure 8:
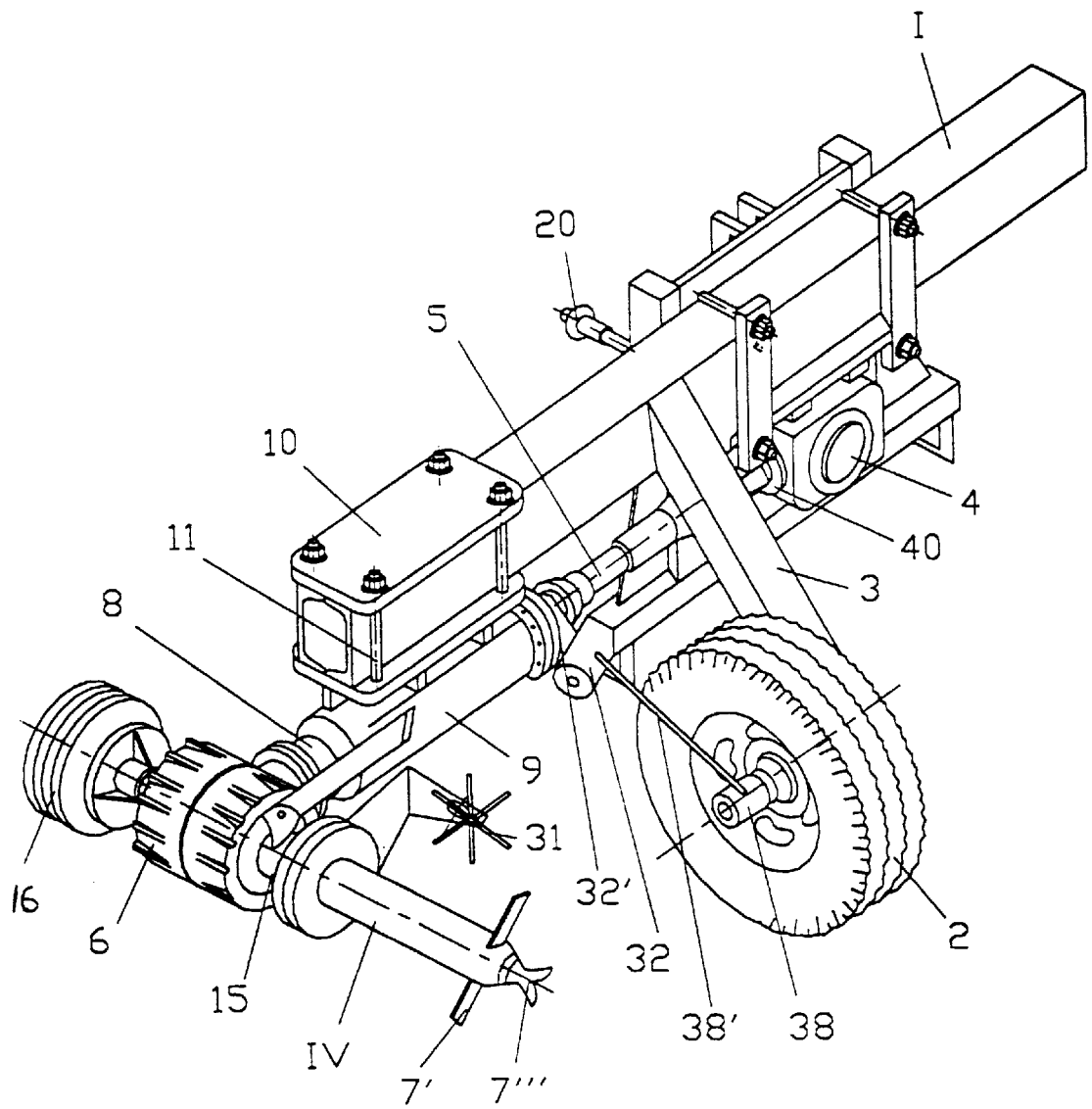
FIG. 8 is a perspective view of a rolling spot cultivator having a side mounted approximately vertical rotary hoe.
Figure 17:
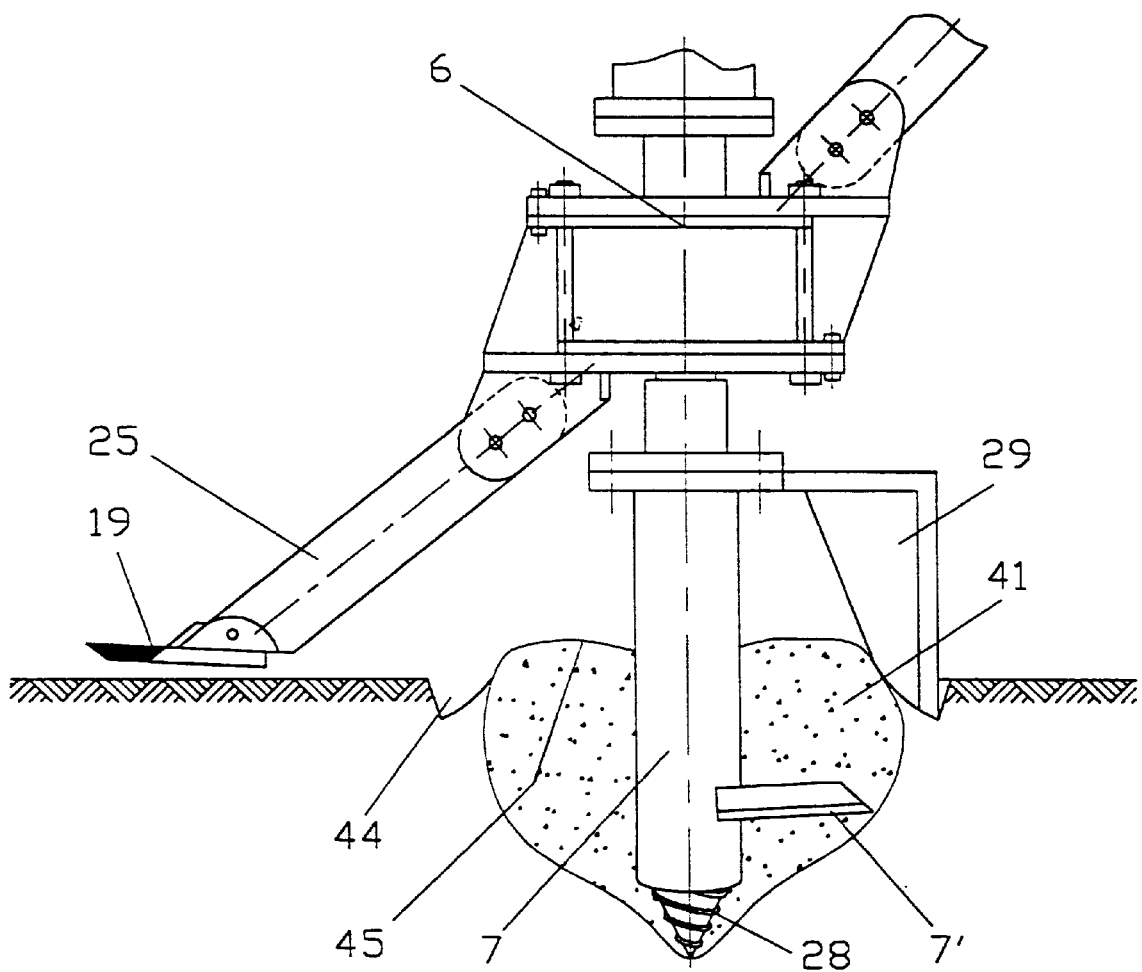
FIG. 17 is a side view of the rolling spot cultivator having a side mounted vertical cultivator together with a cross-section of the tilled cultivated spot.

FIG. 6, 7 and 8 illustrate an embodiment generally similar to that of FIG. 2 except that each of FIGS. 6, 7 and 8 has an additional peripheral cultivator member; namely, the side mounted vertical cultivator (hoe) 29 illustrated in FIG. 6, the side mounted disk 30 in FIG. 7 and the side mounted approximately vertical rotary hoe 31 in FIG. 8. The function of the peripheral side mounted cultivator is illustrated in FIG. 17.

Figure 9:
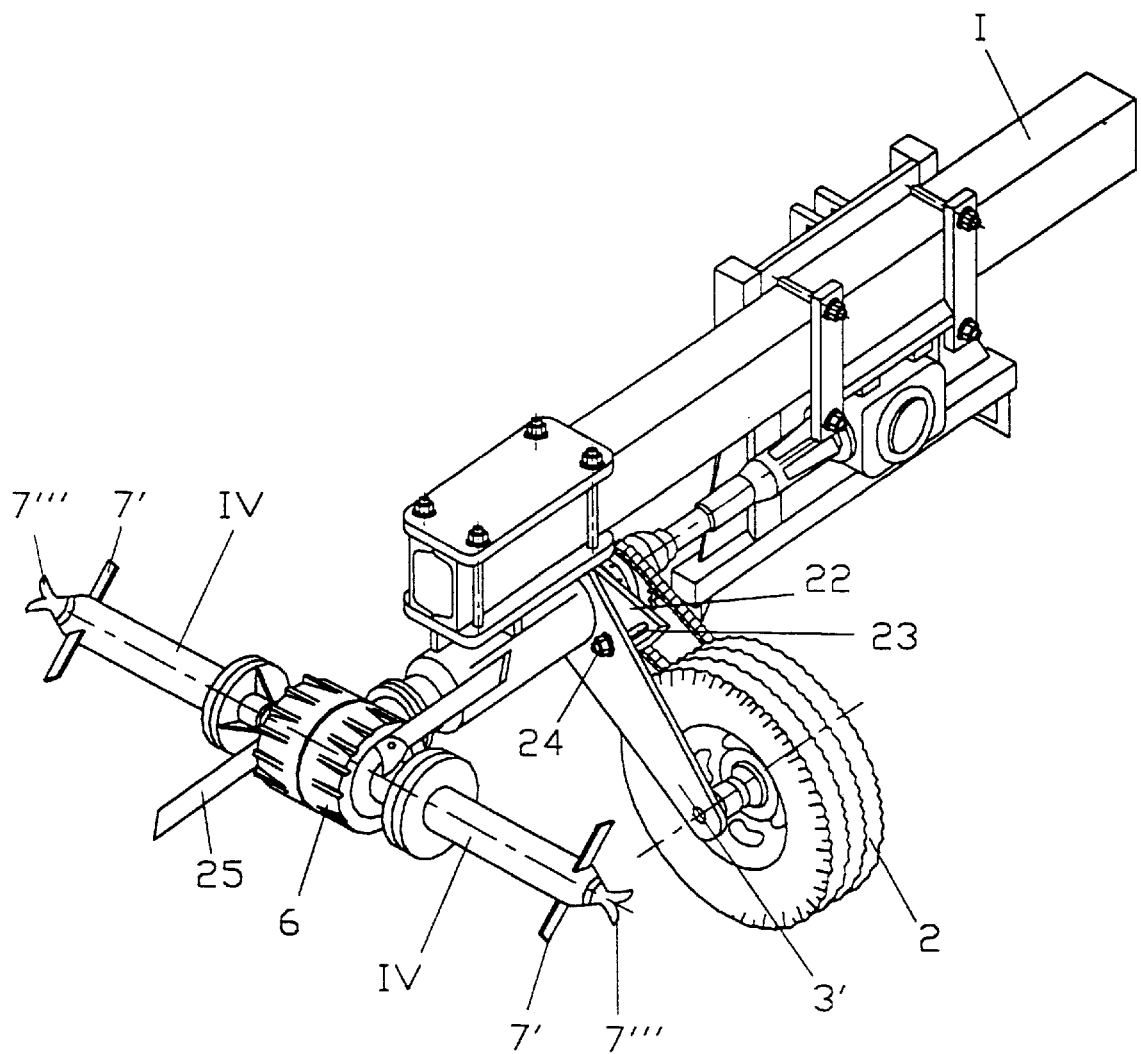
FIG. 9 is a perspective view of a rolling spot cultivator with two rolling cultivators in the same forward moving plane.

FIG. 9 illustrates an embodiment wherein there are two revolving and rolling tilling systems supported by and powered by one transmission head 6. This embodiment provides the advantage that two cultivated spots are sequentially formed by tilling during a single rotation of the head 6. This embodiment also illustrates the adjustment of the depth of penetration of the penetrating edge 7''' of the tilling shaft 7 into the earth by adjustment of the depth control structure comprising base 22, slot 23 at the base 22 and adjusting bolt 24.

Figure 10:
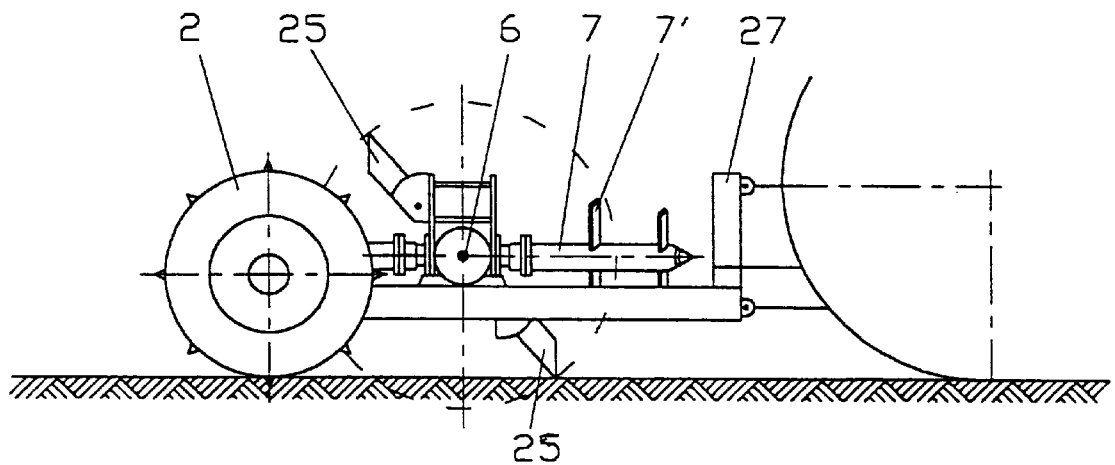
FIG. 10 is a schematic side view of a rolling spot cultivator attached to a tractor and having a single road wheel on one side.

FIG. 10 illustrates the operation of the rolling spot cultivator which is attached to a tractor II through hitch element 27. The rolling spot cultivator is moved in the direction of the tractor II. The revolving and rolling tilling system is illustrated with the end of shank 25 starting its contact with the soil as the rolling transmission tilling head 6 rotates the end of the shank 25 along the circular periphery as shown in outline. The angular relationship of the shank 25 to the tilling shaft 7 is also illustrated.

Figure 11:
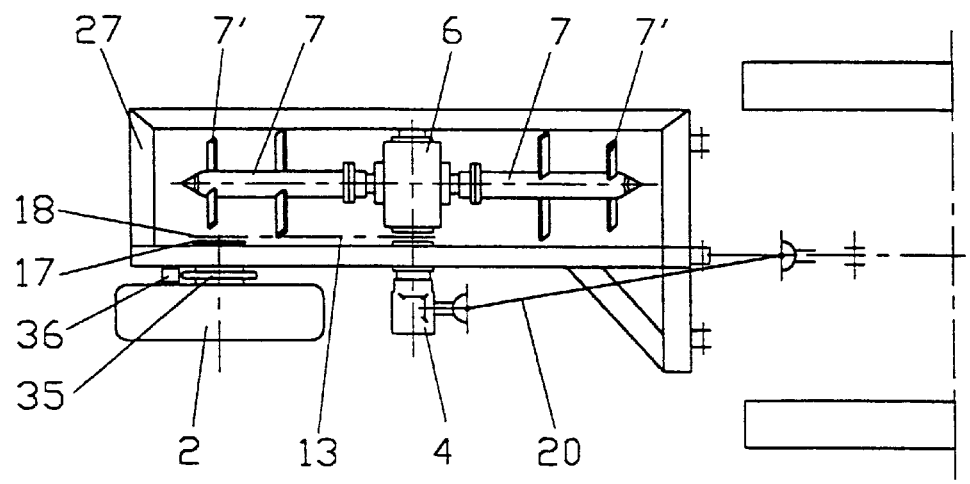
FIG. 11 is a schematic top view of the rolling spot cultivator of FIG. 10 (without shank 25).

FIG. 11 schematically discloses a partial top view of the tilling system of FIG. 10 to illustrate the transmission of power. The rolling transmission head 6 is rolled in the direction of travel by the transmission chain 13 from the rolling wheel 2 via clutch 17 and brake 18 to control the spacing between the cultivated spots by engaging clutch 17 and releasing the brake 18 by a signal from sensor 36 which senses the forward motion of the spot cultivator via sprocket 35 (FIG. 3). The clutch 17 and brake 18 stop the rolling action by signal from sensor 42 (FIG. 3) at an angle before the shank enters the soil. The tilling shaft 7 is rotated by a bevel gear (not illustrated) inside of the tilling head 6. Said bevel gear is powered by a main power transmission gear 4 via clutch 40 (not illustrated) which is able to stop the tilling action and is powered from the tractor II (power unit) through a power train 20 having universal joints at the ends thereof.

Figure 12:
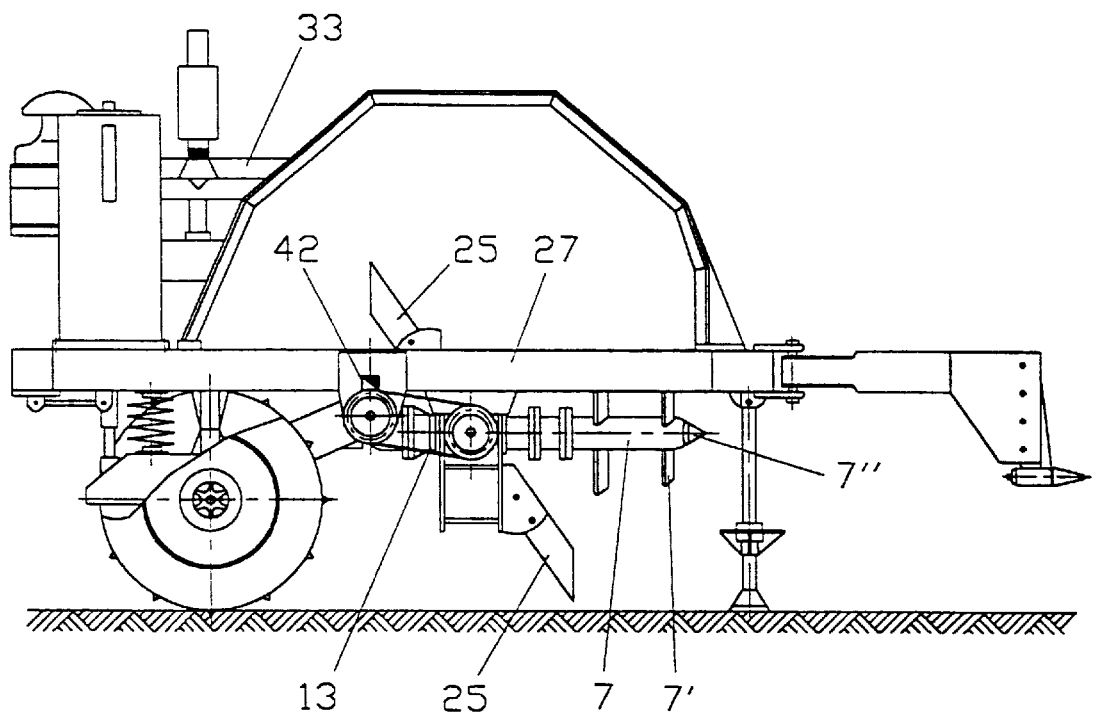
FIG. 12 is a side view of a two wheeled rolling spot cultivator suitable for traction by a vehicle and provided with an engine as a power unit.
Figure 13:
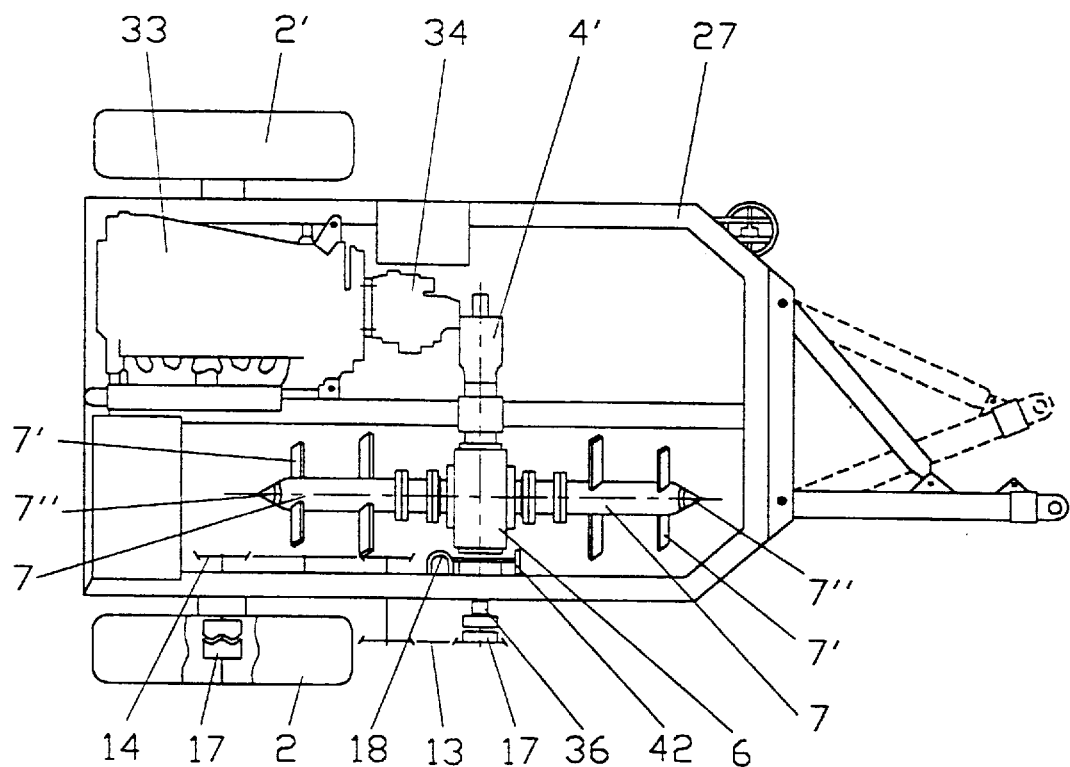
FIG. 13 is a top view of a rolling spot cultivator of FIG. 12.

FIGS. 12 and 13 illustrate a two-wheeled (2, 2') self-powered rolling spot cultivator having an internal combustion engine 33 which powers a hydraulic pump 34 which is connected to a hydraulic motor 4' which drives bevel gears inside the tilling head 6 and provides rotating power to the tilling shafts 7. The hydraulic motor 4' receives a signal from sensor 42 to stop the tilling shaft 7 rotation when coming out from the soil and resume the rotation before entering the soil at the next spot to be cultivated by another signal. The rolling head 6 is rolled in the forward direction of movement by the transmission chain 13 from the rolling wheel 2 with the transmission chain 13 having clutches 17 at the respective ends. Brake 18 is interposed between clutch 17 and the rolling head 6. The electric operated clutch 17 and brake 18 stop the rolling action before the shank 25 enters the soil and tilling shaft 7 following the shank, by an electric signal from the sensor 42, waiting for a signal from electromagnetic sensor 36 to start tilling a new spot at a predetermined spacing from the previous tilled spot. Sensor 36 measures the spacings by sensing teeth on the sprocket 35, spaced on its periphery at predetermined spacings. The sprocket 35 is rotated by the vehicle's wheel (FIG. 3), thus measuring the forward motion. The electromagnetic sensors 36 and 42 sense the approach of an extended steel tooth to send an electric signal to the electric operated valve 43 or the electric operated clutch 17 and brake 18. The approach of the tooth to the electromagnetic sensors 36 and 42 is predetermined by mounting it on sprocket 35 in a correlated relationship (i) to the forward motion of the spot cultivator and the spacing between spots or (ii) on shaft 8 to the angle of the transmission head 6 with the shank 25 and tilling shaft 7 on it, to the beam 1 and the soil surface.

Figure 14A:
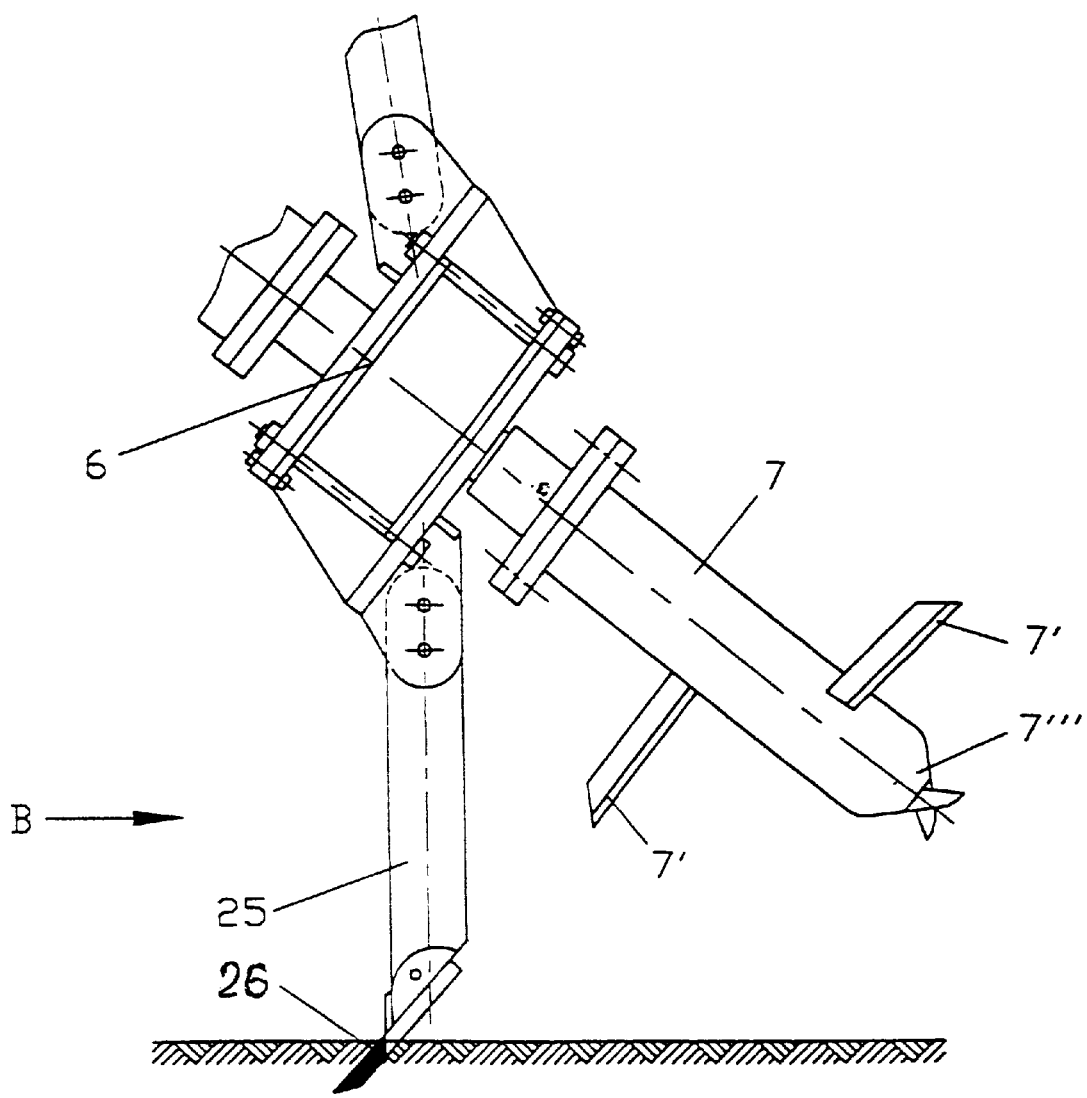
FIG. 14A is a side view of a rolling spot cultivator with a chisel head on the end of the shank.

FIG. 14A schematically illustrates an embodiment wherein the soil penetrating shank 25 with the chisel end 26 penetrating the soil and the tilling shaft 7 has a fish tail edge 7'''.

Figure 14B:
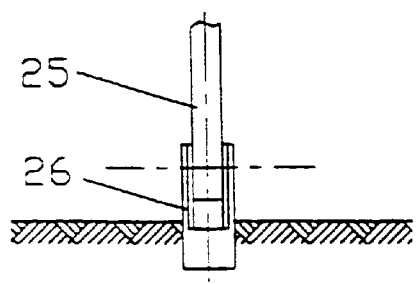
FIG. 14B is a sectional rear view along arrow B in FIG. 14A.

FIG. 14B illustrates the rear view of the chisel head 26 attached to the shank 25.

Figure 15A:
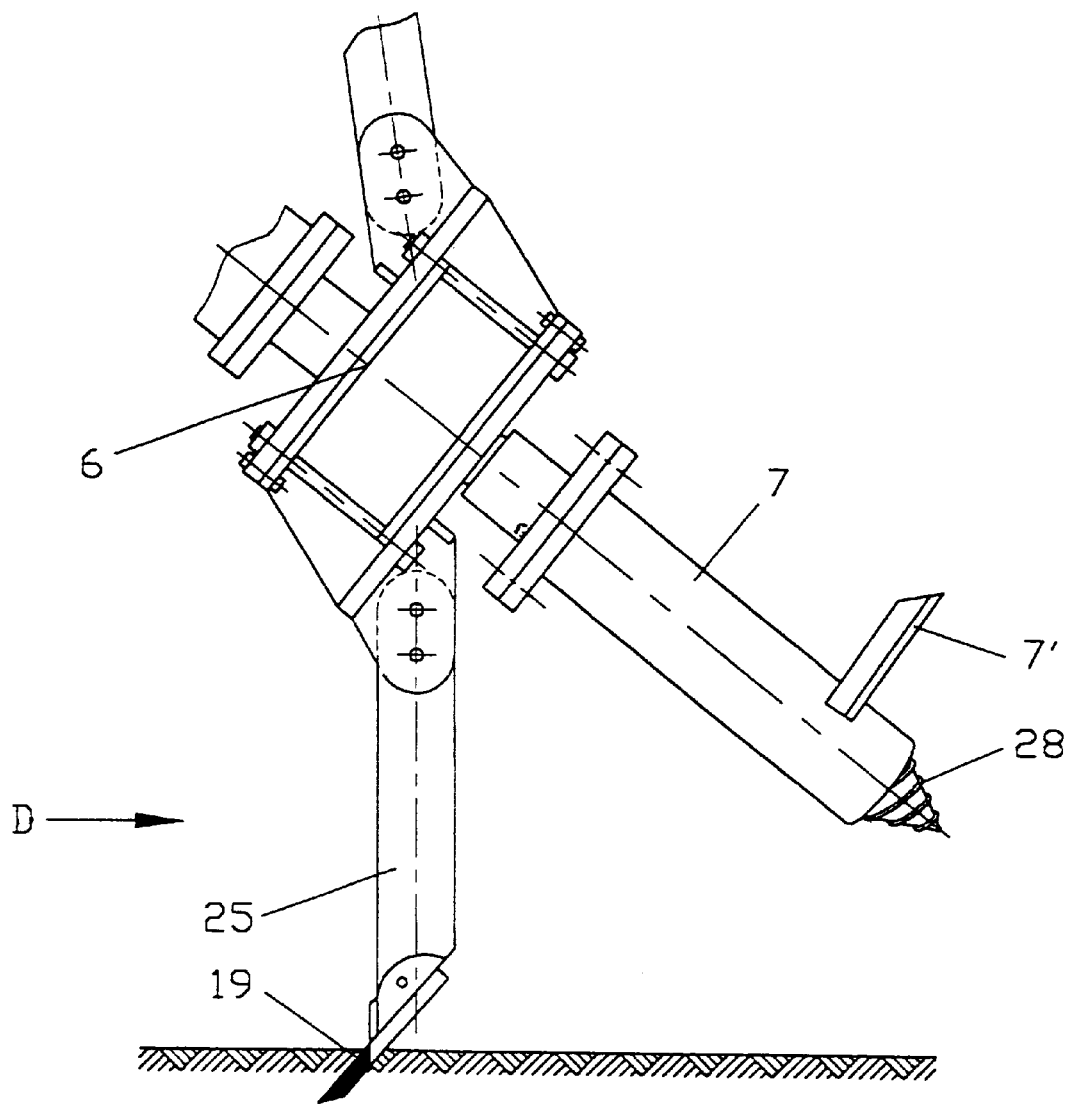
FIG. 15A is a side view of a rolling spot cultivator with a spearhead on the end of the shank.
Figure 15B:
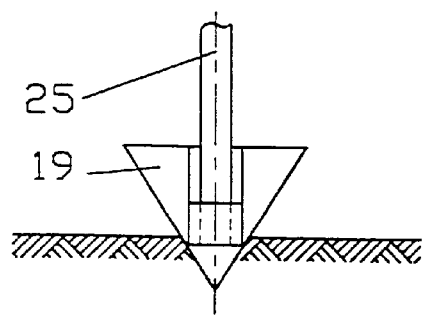
FIG. 15B is a sectional rear view along arrow D in FIG. 15A.

FIGS. 15A and 15B are analogous to FIGS. 14A and 14B except that the shank 25 has a spearhead 19 and the tilling shaft 7 has a helical penetrating edge 28.

Figure 16:
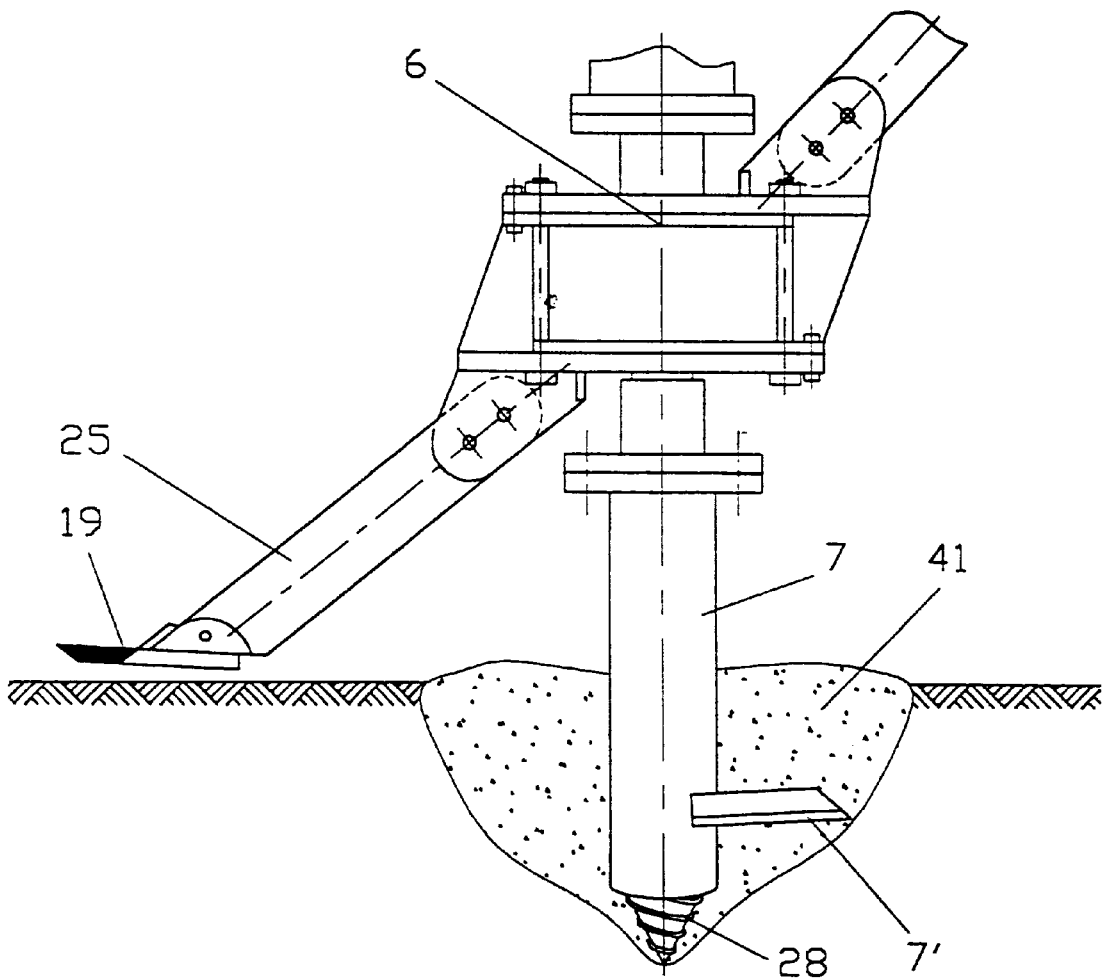
FIG. 16 is a side view of a rolling spot cultivator together with a cross-section of the tilled cultivated spot.

FIG. 16 illustrates the tilling elements illustrated in FIG. 15A rotated sufficiently that the tilling shaft 7 having tilling blade 7' and helical penetrating edge 28 is at the maximum penetration into the soil with the tilled (cultivated) spot 41 illustrated in cross-section. The depth of penetration below the original soil line may be as deep as 0.8 meter or even deeper if desired.

FIG. 17 is similar to FIG. 16 but modified by the attachment of the side mounted vertical cultivator (hoe) 29 which is rigidly connected to the tilling shaft 7 and rotates therewith to form a depression 44 in the soil surrounding the tilled spot 41 and also moves soil toward the tilling shaft to form a mound 45. The depression 44 serves as a collector of water. The side mounted vertical cultivator (hoe) 29 may be replaced by a side mounted disk cultivator 30 or the side mounted rotary hoe 31 as illustrated in FIGS. 7 and 8 respectively.

Figure 18:
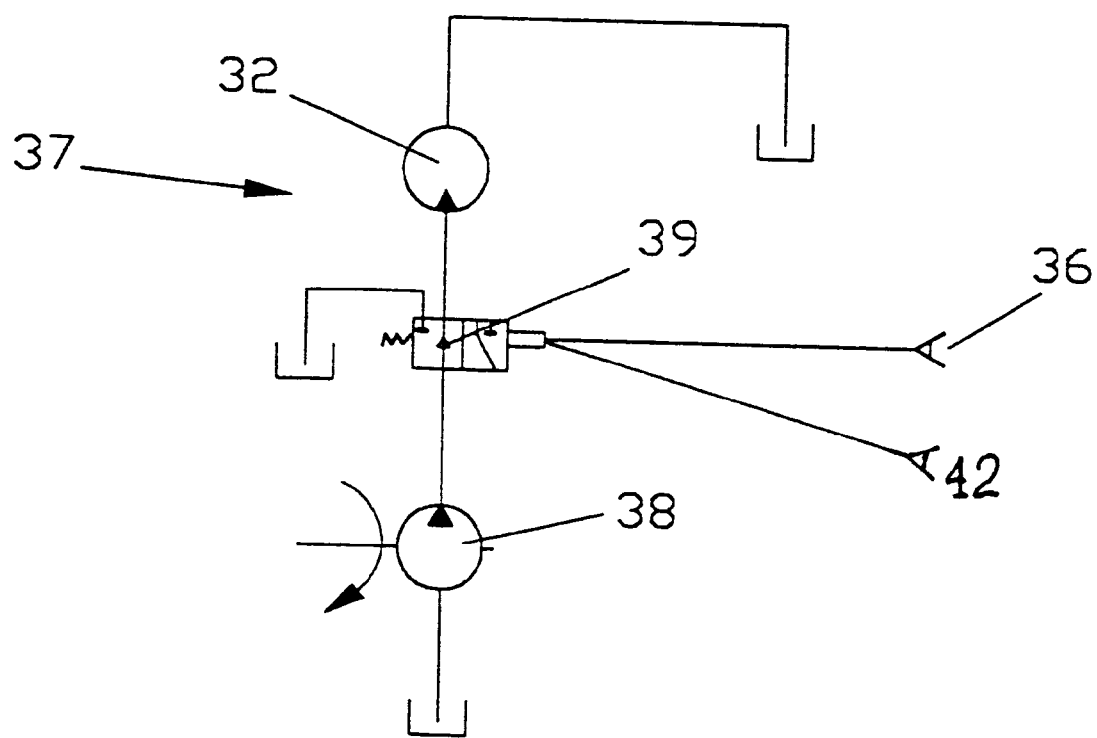
FIG. 18 is a schematic diagram of a hydraulic system to control the rolling action.
Figure 19:
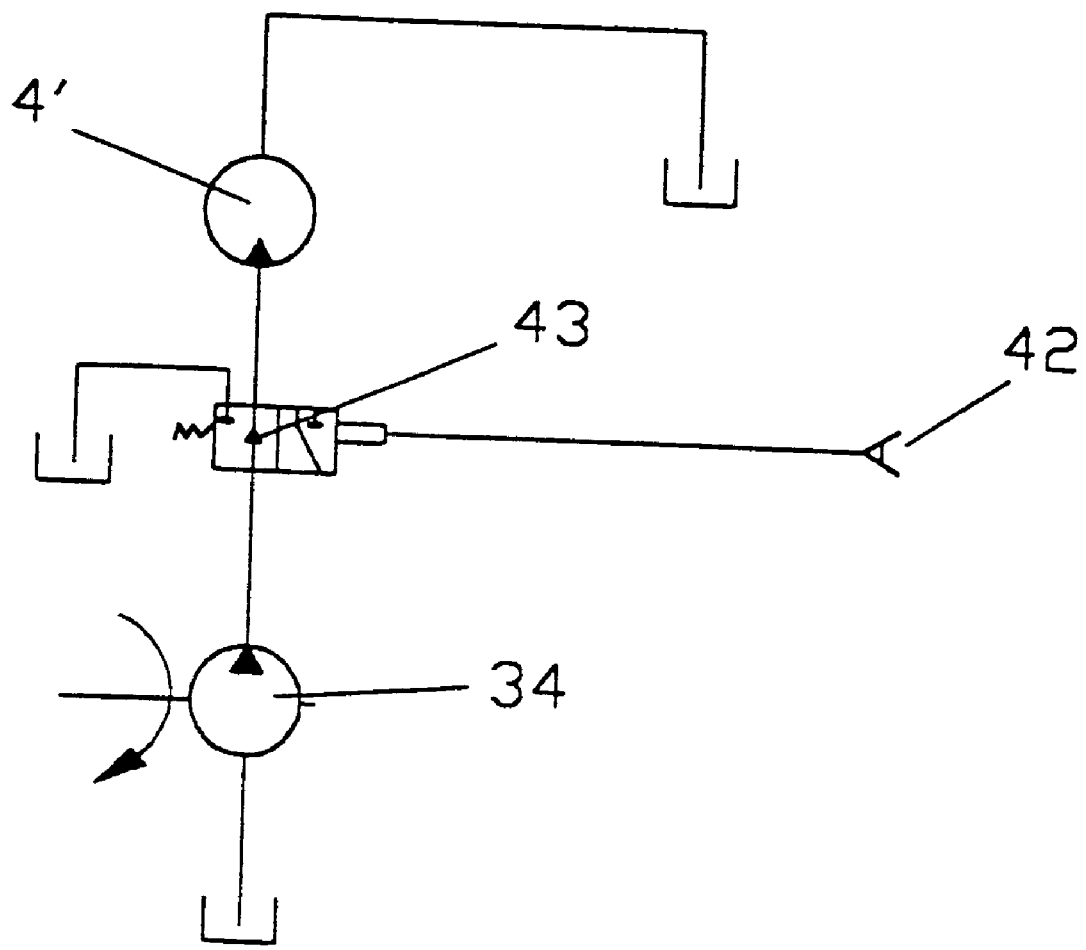
FIG. 19 is a schematic diagram of a hydraulic system to control the tilling action.

FIGS. 18 and 19 are schematic diagrams of hydraulic systems with FIG. 18 illustrating the system controlling the rolling action and FIG. 19 illustrating the system controlling the tilling action. The hydraulic pump 38 in FIG. 18 (also illustrated in FIG. 2) or a pump in the tractor II provides hydraulic energy via an electric operated valve 39 to control the rolling action via the hydraulic motor 32 which rotates the transmission heads 6 and 6'. The electric operated valve 39 receives signals from the electromagnetic sensor 42 sensing the angular position of the tilling shaft 7 in terms of the forward rolling motion. The hydraulic control system stops the rolling action before the shank 25 enters the soil, waiting for an electric signal from electromagnetic sensor 36 to start tilling a new spot at a measured spacing from the last one. Sensor 36 senses the forward motion and gives an electric signal to start tilling the new spot when a tooth on sprocket 35 approaches sensor 36. The teeth on the sprocket 35 are spaced to measure the forward motion to be equal to the predetermined spacing between the cultivated spots. Referring to FIG. 19, the hydraulic pump 34 which is powered by the internal combustion engine 33 illustrated in FIG. 13 or a pump in the tractor II, transmits power to the hydraulic motor 4' through electric operated valve 43. The hydraulic motor 4' provides power to the gears in the tilling head 6 to power and control the tilling shafts 7 (illustrated in FIG. 13). In FIG. 19, electromagnetic sensor 42 senses the angular position of the transmission gear head 6 with the shank 25 and the tilling shaft 7 and provides this information to the electric operated valve 43 to stop or resume the rotary tilling action when needed, especially to stop the rotary tilling action while coming out of the tilled spot to prevent throwing out of soil.

Figure 20A:
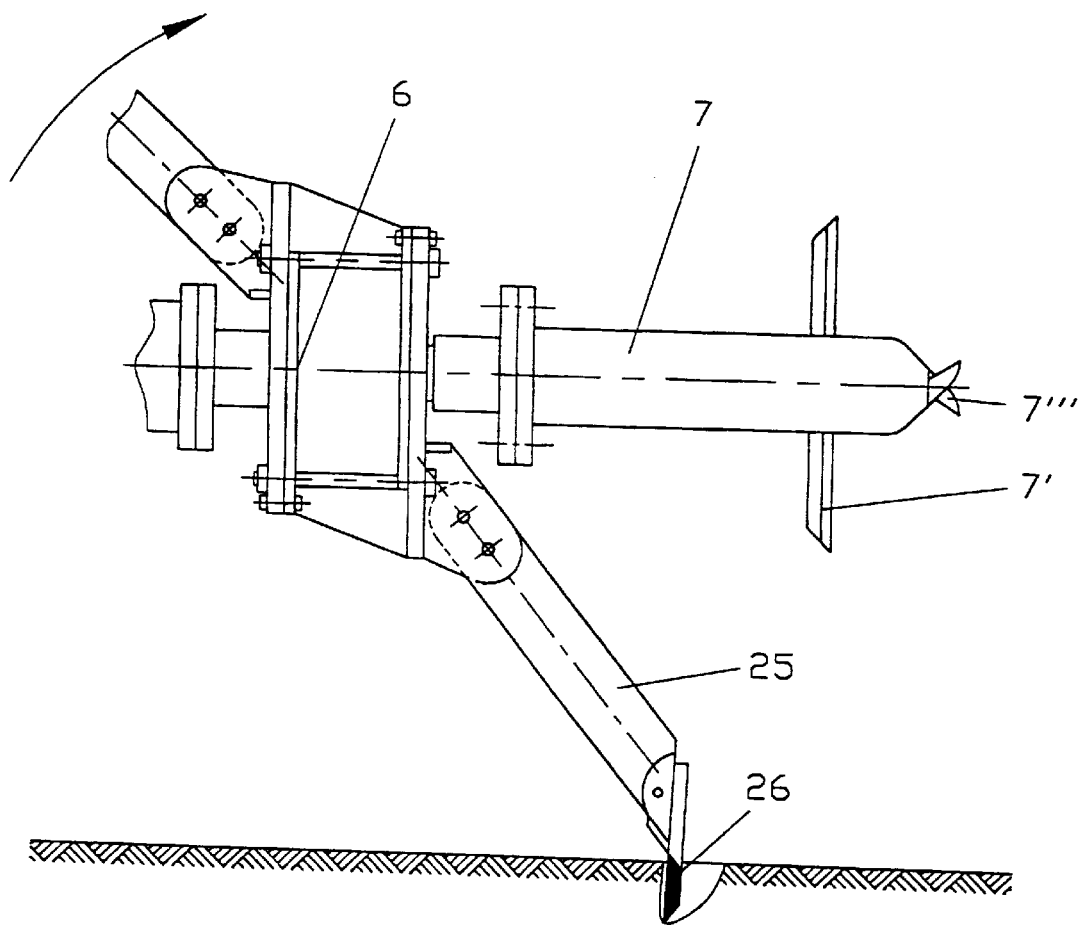
FIGS. 20A, 20B, 20C and 20D illustrate the continuous movement of the transmission head with the tilling shaft and the shank.
Figure 20B:
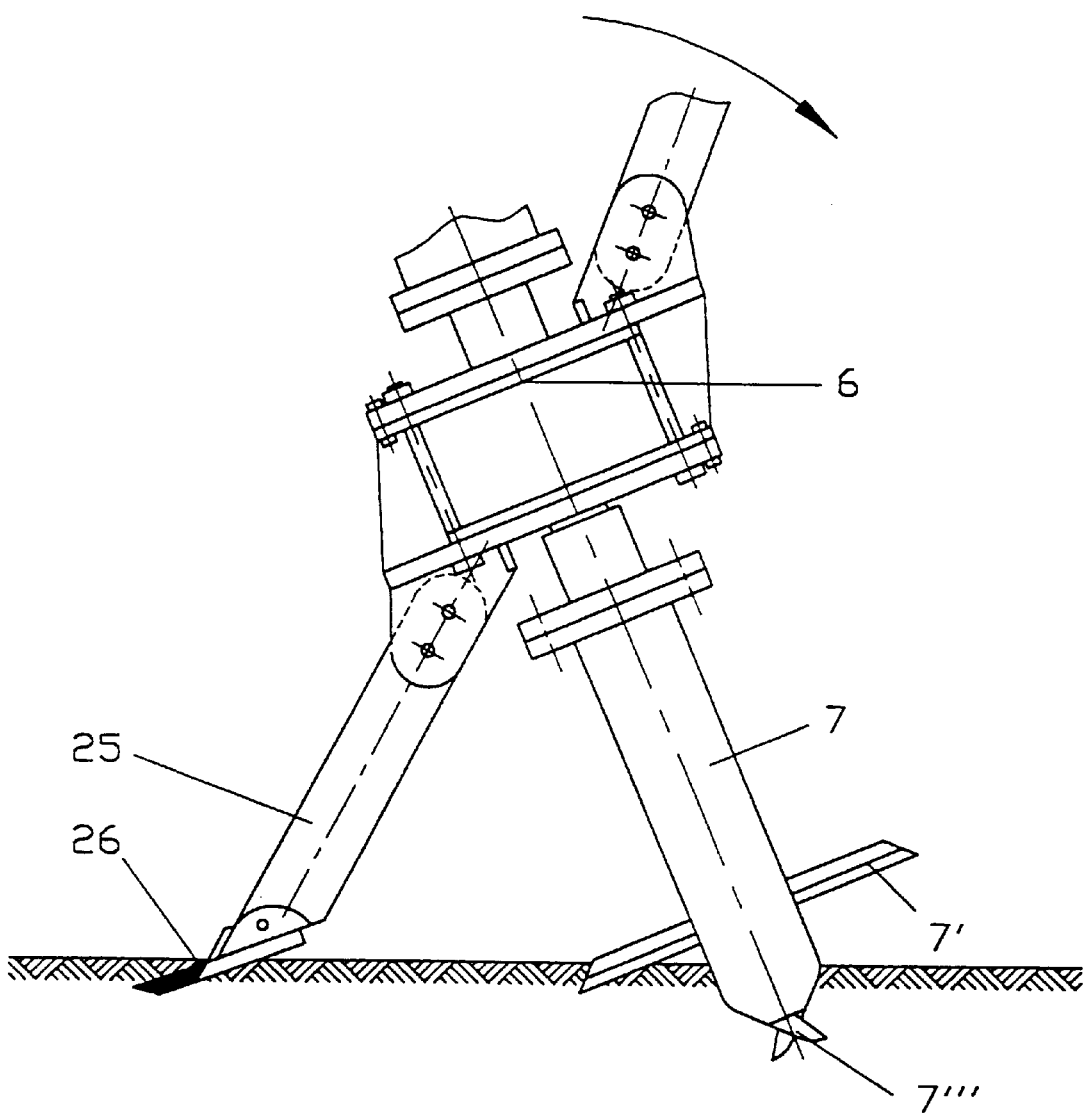
Figure 20C:
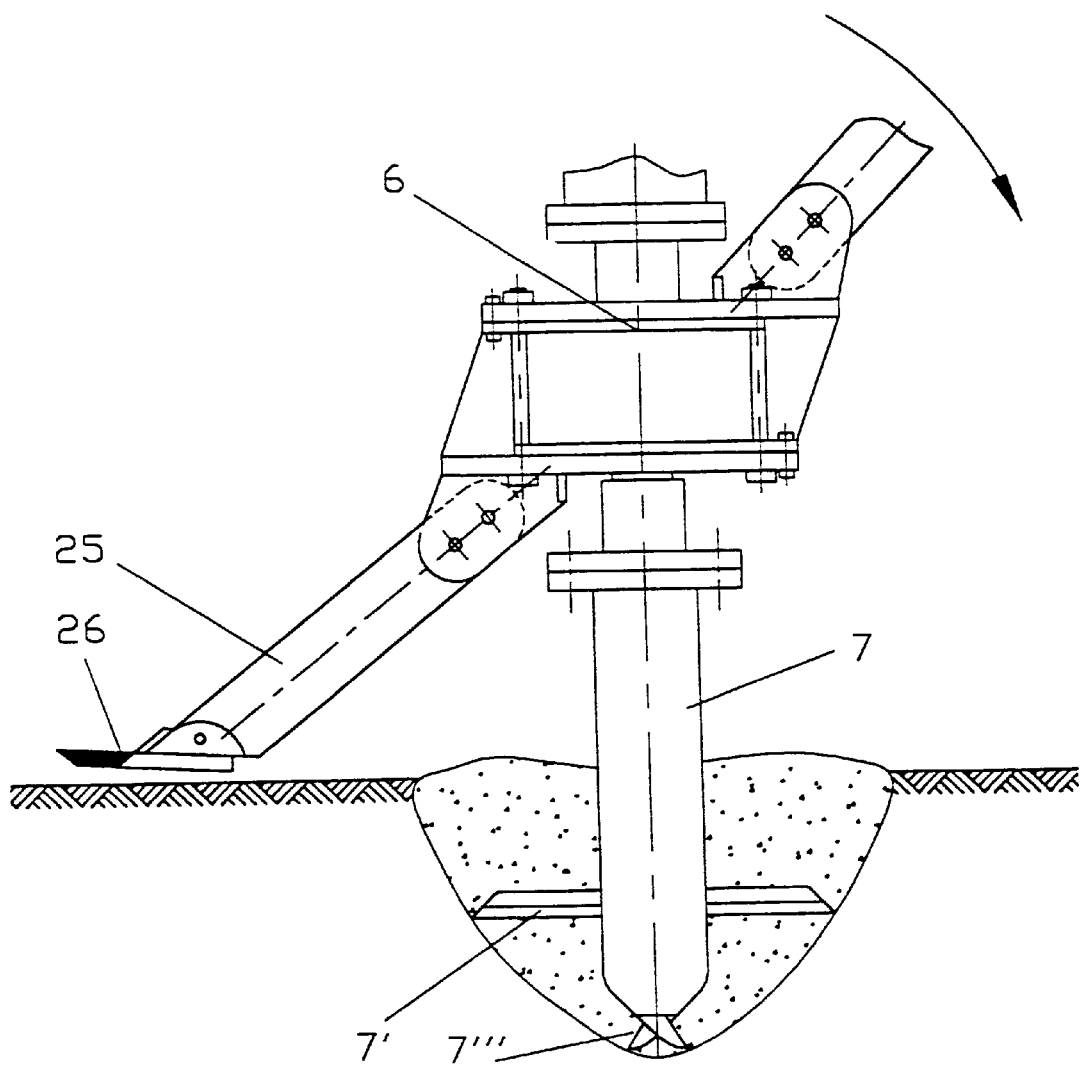
Figure 20D:
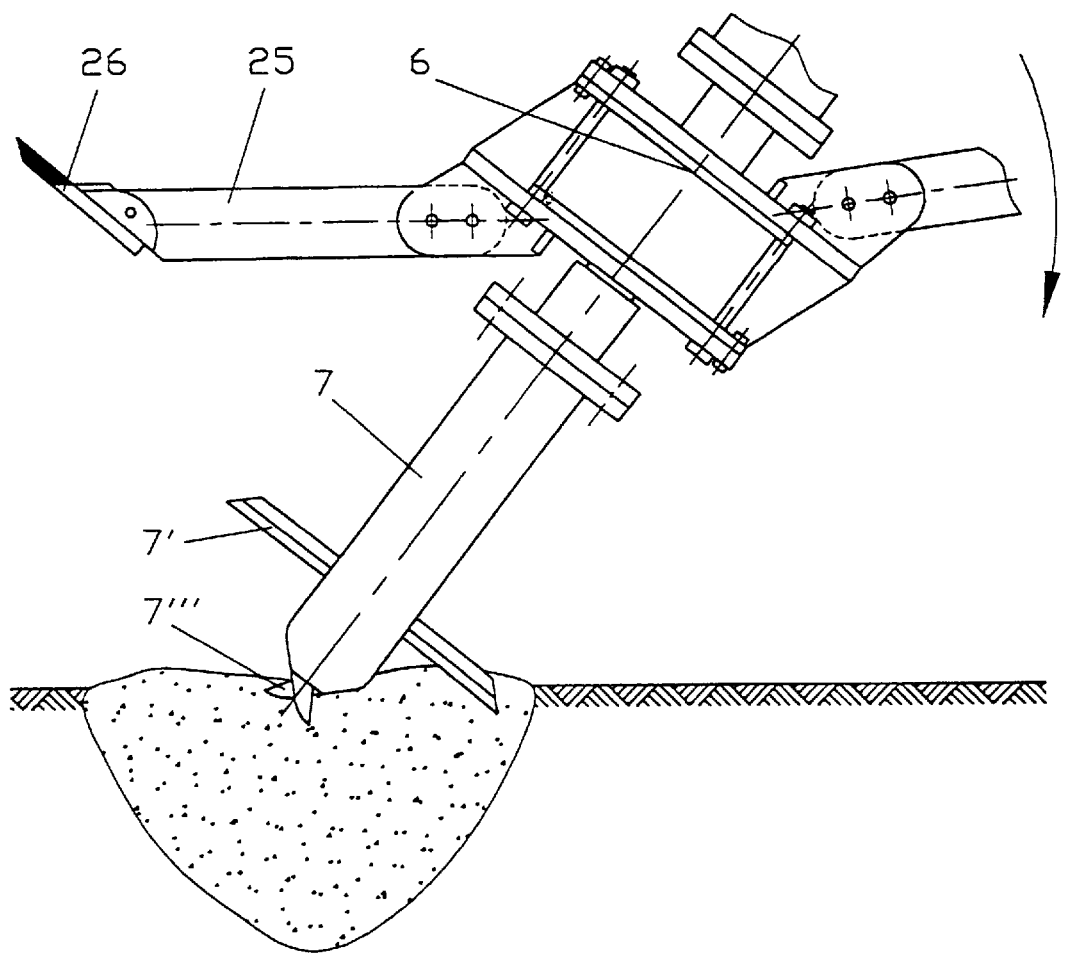

FIGS. 20A, 20B, 20C and 20D illustrate the sequence of forming a cultivated spot. FIG. 20A illustrates the initial penetration of the penetrating end of the shank 25 into the soil. FIG. 20B illustrates the penetration of the edge of the tilling shaft into the soil at the position where the blade first contacts the soil and the shank 25 continues to remain in the soil. FIG. 20C illustrates the position where the penetrating tilling shaft is at its maximum penetration into the soil and the shank has recently exited the soil. FIG. 20D illustrates the position of the tilling shaft as it is exiting the cultivated spot. The shank 25 functions to hold the tilling apparatus in position. After the shank 25 penetrates the soil, the soil acts to hold the shank which forces the edge of the tilling shaft to cut into the soil and to penetrate it even when the soil is very hard. Without the holding force of the shank, the tilling shaft may drift forward on the surface of the soil without penetrating it. As a result of the sequential contact of the shank 25 with the soil and the tilling action of the tilling shaft, each cultivated spot is preceded by a small section of broken soil where the shank penetrated the soil at a constant distance preceding each cultivated spot.

The number of the cutting blades 7', edge 7" and/or the cutting teeth 46 and their respective shapes are selected dependent upon local conditions of the soil.

What is claimed is:

1. A method of producing a plurality of spaced apart cultivated spots in soil comprising:

moving a spot cultivator across the soil in a direction in which the spaced apart cultivated spots are to be formed, said spot cultivator including at least one tilling shaft which is mounted to roll about a substantially horizontal axis which moves with the spot cultivator and which is rotatable about a longitudinal axis of said at least one tilling shaft;

rolling said at least one tilling shaft about said substantially horizontal axis in a plane which intersects the soil, said at least one tilling shaft having a length sufficient to contact and penetrate the soil during each rotation about the horizontal axis;

rotating said at least one tilling shaft around its longitudinal axis when it penetrates the soil, said at least one tilling shaft having at least one blade extending from the at least one tilling shaft and rotating with said at least one tilling shaft around said longitudinal axis so that rotation of said at least one tilling shaft as it penetrates the soil causes said at least one blade to rotate in the soil thereby disturbing the soil to form a cultivated spot in the soil as said at least one tilling shaft penetrates into the soil and exits from the soil as said at least one tilling shaft rolls about said horizontal axis;

stopping the rotation of said at least one tilling shaft before said at least one tilling shaft and said at least one blade extending therefrom completely exit the soil to prevent throwing out soil and resuming rotation of said at least one tilling shaft before it penetrates the soil at a next spot to be cultivated;

controlling the rolling of said at least one tilling shaft about said horizontal axis after it exits from the soil so that said at least one tilling shaft again contacts the soil to begin forming a second cultivated spot at a predetermined distance from a previous cultivated spot.

2. The method of claim 1, wherein said rolling about said horizontal axis is controlled to stop said rolling after said at least one tilling shaft exits the soil and subsequently to resume said rolling to cause said at least one tilling shaft to penetrate said soil at said predetermined distance.

3. The method of claim 1 further comprising:

providing at least one soil penetrating shank on said spot cultivator, said at least one soil penetrating shank being mounted to roll about said horizontal axis, and said at least one soil penetrating shank being arranged to enter the soil before entry of the at least one tilling shaft, said at least one soil penetrating shank remaining in the soil when said at least one tilling shaft penetrates the soil.

4. The method of claim 3, wherein said rolling about said horizontal axis is controlled to stop and start said rolling immediately before said at least one soil penetrating shank enters the soil.

5. The method of claim 3, further comprising mounting a downwardly extending cultivator member which is rigidly connected to said at least one tilling shaft at a position axially above said at least one tilling element and which is spaced from said at least one tilling shaft and rotates therewith, said downwardly extending cultivator member being of a sufficient length so that when said at least one tilling shaft reaches a maximum penetration of the soil, the downwardly extending cultivator member makes a penetration into the soil and forms a depression in the soil surrounding the cultivated spot as it rotates with said at least one tilling shaft.

6. The method of claim 5, further comprising pushing the soil toward the at least one tilling shaft to form a mound of tilled soil while forming said depression in the soil.

7. The method of claim 1, further comprising mounting a downwardly extending cultivator member which is rigidly connected to said at least one tilling shaft at a position axially above said at least one tilling element and which is spaced from said at least one tilling shaft and rotates therewith, said downwardly extending cultivator member being of a sufficient length so that when said at least one tilling shaft reaches a maximum penetration of the soil, the downwardly extending cultivator member makes a penetration into the soil and forms a depression in the soil surrounding the cultivated spot as it rotates with said at least one tilling shaft.

8. The method of claim 7, further comprising pushing the soil toward the at least one tilling shaft to form a mound of tilled soil while forming said depression in the soil.

9. A travelling rolling spot cultivator comprising:

at least one tilling shaft (7) which is rotatable by a drive mechanism about a longitudinal axis thereof and having a soil penetrating edge (7", 7"') and having at least one tilling element (7') extending from the at least one tilling shaft (7) and rotating with said at least one tilling shaft (7);

said at least one tilling shaft (7) being mounted to roll about a horizontal shaft (8) in a soil penetrating plane while said horizontal shaft moves in a direction of travel of the spot cultivator, whereby said at least one rotating tilling shaft pulverizes the soil while entering the soil at an entry angle and tills the soil while the horizontal shaft (8) moves in said direction of travel and the tilling shaft (7) continuously changes its angle relative to the soil from the entry angle to a vertical position, then to a backward angle and exits the soil;

a control (i) to stop the rotation of said at least one tilling shaft before said at least one tilling shaft and said at least one tilling element completely exits the soil to prevent throwing out soil and (ii) to resume rotation of said at least one tilling shaft before it penetrates the soil at a next spot to be cultivated;

a system to control the rolling of said at least one tilling shaft about said horizontal shaft after it exits from the soil so that said at least one tilling shaft again contacts the soil to begin forming a second cultivated spot at a predetermined distance from a previous cultivated spot; and said horizontal shaft (8) being mounted on a support structure which is adapted to be connected to or mounted on a self propelled vehicle.

10. The travelling rolling spot cultivator of claim 9, further comprising at least one soil penetrating shank (25) having a soil penetrating end, the at least one soil penetrating shank being mounted to roll about said horizontal shaft (8) with its soil penetrating end rolling in a same soil penetrating plane as said at least one tilling shaft rolls in or in a soil penetrating plane parallel thereto, said at least one soil penetrating shank being of a sufficient length so that it penetrates the soil before the penetrating edge of said at least one tilling shaft penetrates the soil.

11. The travelling rolling spot cultivator of claim 10, wherein said at least one tilling shaft is rotatably connected to a transmission head (6) to rotate about the longitudinal axis of said at least one tilling shaft, said transmission head (6) being connected to a power unit which provides power to rotate the at least one tilling shaft (7) about its longitudinal axis, said power unit being connected to the at least one tilling shaft through said transmission head.

12. The travelling rolling spot cultivator of claim 11, wherein said soil penetrating edge is a member selected from the group consisting of a cone, a cone supporting a helical cutting edge and a fish tail.

13. The travelling rolling spot cultivator of claim 11, wherein said soil penetrating end of the at least one soil penetrating shank (25) is a chisel blade with its edge positioned in said soil penetrating plane or is a spear head on its soil penetrating end.

14. The travelling rolling spot cultivator of claim 11, further comprising a ground wheel (2) which is connected to said transmission head (6) and transmits rolling by a transmission to said transmission head (6) and wherein said soil penetrating plane is a substantially vertical plane.

15. The travelling rolling spot cultivator of claim 14, wherein the transmission of the ground wheel (2) to the transmission head (6) further includes (i) a brake (18) adopted to stop a rolling motion of the transmission head (6) around said horizontal shaft; and (ii) a clutch (17) functioning to engage or disengage the transmission head (6) from its rolling motion.

16. The travelling rolling spot cultivator of claim 14 wherein the transmission of motion of the ground wheel to the transmission head is a member selected from the group consisting of gears, chain and sprockets and hydraulic transmission.

17. The travelling rolling spot cultivator of claim 11, wherein two opposed tilling shafts (7) are connected to said transmission head (6).

18. The travelling rolling spot cultivator of claim 11, wherein said horizontal shaft has an additional transmission head with at least one tilling shaft connected thereto positioned at the opposed ends of said horizontal shaft.

19. The travelling rolling spot cultivator of claim 10, further comprising a downwardly extending cultivator member which is rigidly connected to said at least one tilling shaft at a position axially above said at least one tilling element and which is spaced from said at least one tilling shaft and rotated therewith, said downwardly extending cultivator member being a sufficient length so that when said at least one tilling shaft reaches a maximum penetration of the soil, the downwardly extending cultivator member penetrates into the soil.

20. The travelling rolling spot cultivator of claim 19, wherein said downwardly extending cultivator member is a side mounted hoe.

21. The travelling rolling spot cultivator of claim 19, wherein said downwardly extending cultivator member is a side mounted disk.

22. The travelling rolling spot cultivator of claim 19, wherein said downwardly extending cultivator member is a side mounted approximately vertical rotary hoe.

23. The travelling rolling spot cultivator of claim 9, wherein the control to stop said rotation comprises a sensor (42), (i) a clutch (40) or (ii) a hydraulic valve (43) and a hydraulic motor (4'), to stop rotation of the tilling shaft before it exits the soil; and the system to control the rolling comprises a sensor (42), a sensor (36), and (i) a clutch (17) or (ii) a hydraulic valve (39) and a hydraulic motor (32), to resume the rolling to start a new spot at a predetermined spacing between the spots in the direction of travel.

24. A travelling rolling spot cultivator comprising:

at least one tilling shaft (7) which is rotatable by a drive mechanism about a longitudinal axis thereof and having a soil penetrating edge (7", 7'") and having at least one tilling element (7') extending from the at least one tilling shaft (7) and rotating with said at least one tilling shaft (7);

said at least one tilling shaft (7) being mounted to roll about a horizontal shaft (8) in a soil penetrating plane while said horizontal shaft moves in a direction of travel of the spot cultivator, whereby said at least one tilling shaft pulverizes the soil while entering the soil at an entry angle and tills the soil while the horizontal shaft (8) moves in said direction of travel and the at least one tilling shaft (7) continuously changes its angle relative to the soil from the entry angle to a vertical position, then to a backward angle and exits the soil and then rolls around the horizontal shaft (8) to the next spot to be cultivated; and said horizontal shaft (8) being mounted on a support structure which is adapted to be connected to or mounted on a self propelled vehicle;

at least one soil penetrating shank (25) having a soil penetrating end, the at least one soil penetrating shank being mounted to roll about said horizontal shaft (8) with its soil penetrating end rolling in a same soil penetrating plane as said at least one tilling shaft rolls in or in a soil penetrating plane parallel thereto, said at least one soil penetrating shank being of a sufficient length so that it penetrates the soil before the penetrating edge of said at least one tilling shaft penetrates the soil;

said at least one tilling shaft being rotatably connected to a transmission head (6) to rotate about the longitudinal axis of said at least one tilling shaft, said transmission head (6) being connected to a power unit which provides power to rotate the at least one tilling shaft (7) about its longitudinal axis, said power unit being connected to the at least one tilling shaft through said transmission head;

a ground wheel (2) which is connected to said transmission head (6) and transmits rolling by a transmission to said transmission head (6) and wherein said soil penetrating plane is a vertical plane;

a downwardly extending cultivator member which is rigidly connected to said at least one tilling shaft at a position axially above said at least one tilling element and which is spaced from said at least one tilling shaft and rotated therewith, said downwardly extending cultivator member being a sufficient length so that when said at least one tilling shaft reaches a maximum penetration of the soil, the downwardly extending cultivator member penetrates into the soil;

a control system for controlling the rolling and a control system for controlling the tilling shaft rotation; and transmission of motion of the ground wheel (2) to the transmission head (6) further includes (i) a brake (18) adapted to stop a rolling motion of the transmission head (6) around said horizontal shaft; and (ii) a clutch (17) functioning to engage or disengage the transmission head (6) from its rolling motion.

25. A travelling rolling spot cultivator comprising:

at least one tilling shaft (7) which is rotatable by a drive mechanism about a longitudinal axis thereof and having a soil penetrating edge (7", 7''') and having at least one tilling element (7') extending from the at least one tilling shaft (7) and rotating with said at least one tilling shaft (7);

at least one soil penetrating shank (25) having a soil penetrating end, the at least one soil penetrating shank being mounted to roll about a horizontal shaft (8) with its soil penetrating end rolling in a same soil penetrating plane as said at least one tilling shaft rolls in or in a soil penetrating plane parallel thereto, said at least one soil penetrating shank being of a sufficient length so that it penetrates the soil before the soil penetrating edge of said at least one tilling shaft penetrates the soil;

a downwardly extending cultivator member (29) which is rigidly connected to said at least one tilling shaft at a position axially above said at least one tilling element and which is spaced from said at least one tilling shaft and rotated therewith;

said at least one tilling shaft (7) being mounted to roll about said horizontal shaft (8) in a soil penetrating plane while said horizontal shaft moves in a direction of travel of the spot cultivator to pulverize the soil while entering the soil at an entry angle and tilling the soil while the horizontal shaft (8) moves in said direction of travel and the tilling shaft (7) continuously changes its angle relative to the soil from the entry angle to a vertical position, then to a backward angle and exits the soil and then rolls around the horizontal shaft (8) to a next spot to be cultivated;

said downwardly extending cultivator member being a sufficient length so that when said at least one tilling shaft reaches a maximum penetration of the soil, the downwardly extending cultivator member penetrates into the soil; and said horizontal shaft (8) being mounted on a support structure which is adapted to be connected to or mounted on a self propelled vehicle.

* * * * *